US006978259B1

(12) United States Patent
Anderson et al.

(10) Patent No.: US 6,978,259 B1
(45) Date of Patent: Dec. 20, 2005

(54) AUTOMATED SYSTEM ADAPTATION TECHNIQUE PARTICULARLY FOR DATA STORAGE SYSTEMS

(75) Inventors: Eric Anderson, Berkeley, CA (US); Michael Hobbs, Geelong (AU); Kimberly Keeton, Berkeley, CA (US); Susan Spence, San Jose, CA (US); Mustafa Uysal, Davis, CA (US); Alistair Craig Veitch, Mountain View, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 610 days.

(21) Appl. No.: 10/046,463

(22) Filed: Oct. 23, 2001

(51) Int. Cl.$^7$ .......................................... G06F 15/18
(52) U.S. Cl. ..................................................... 706/19
(58) Field of Search ......................................... 706/19

(56) References Cited

U.S. PATENT DOCUMENTS

| | | | | |
|---|---|---|---|---|
| 5,726,913 | A | * | 3/1998 | Grimsrud ..................... 702/186 |
| 5,751,575 | A | * | 5/1998 | Hirosawa et al. ............. 700/83 |
| 5,995,729 | A | * | 11/1999 | Hirosawa et al. .............. 703/1 |
| 6,366,644 | B1 | * | 4/2002 | Sisk et al. .................. 379/1.04 |

OTHER PUBLICATIONS

Anderson, Eric, "Simple Table-based Modeling of Storage Devices," Storage and Content Distribution Department, Hewlett-Packard Laboratories, Jul. 14, 2001.
Alvarez, Guillermo; Keeton, Kim; Merchant, Arif; Riedel, Erik; and Wilkes, John, "Storage Systems Management," 2000-06-Sigmetrics Tutorial, Hewlett-Packard Company, Jun. 17, 2000.
Wilkes, John, "Grand Unified Theosophical Storage," Slide Presentation of Hewlett-Packard Company, May 31, 1999.
Anderson, Eric; Hall, Joe; Hartline, Jason; Hobbs, Michael; Karlin, Anna; Saia, Jared; Swaminathan, Ram; Wilkes, John, "An Experimental Study of Data Migration Algorithms," Proceedings of the 5th Workshop on Algorithm Engineering, University of Aarhus, Denmark, Aug. 2001.
Wilkes, John, "Storage Management," Slide Presentation of Hewlett-Packard Company, Mar. 10, 2000.
Michael Stillger, Guy Lohman, Volker Mark & Mokhtar Kandil—"LEO—DB2's LEarning Optimizer"—Sep. 2001—pp. 1-10.

(Continued)

Primary Examiner—Anthony Knight
Assistant Examiner—Michael B. Holmes

(57) ABSTRACT

An automated system adaptation technique for computer systems, networks and subsystems generally and, more particularly, for data storage systems. The invention programmatically designs, configures and manages a system, such as a data storage system. This is accomplished by performing a sequence of steps in an iterative loop, including analyzing the operation of the system under a workload, generating a new design based on the analysis and migrating the existing system to the new design. By systematically exploring a large design space and developing designs based on analyses of the workload, the invention generates designs that are improved in comparison to conventional design techniques. By programmatically repeating these tasks, the invention causes the system to converge to one that supports the workload without being over-provisioned.

33 Claims, 13 Drawing Sheets

OTHER PUBLICATIONS

Surajit Chaudhuri & Vivek Narasayya—"AutoAdmin What-if" Index Analysis Utility—Jun. 1998—pp. 1-12.

Remzi H. Arpaci-Dusseau, Eric Anderson, Noah Treuhaf, David E. Culler, Joseph M. Hellerstein, David Patterson & Kathy Yelick—"Cluster I/O with River: Making the Fast Case Common"—May 1999—pp. 1-13.

K. Appleby, S. Fakhouri, L. Fong, G. Goldszmidt, M. Kalantar, S. Krishnakumar, D.P. Pazel, J. Pershing and B. Rochwerger—"Oceano—SLA Based Management of a Computing Utility"—May 2001—pp. 1-14.

Jeffrey S. Chase, Darrell C. Anderson, Prachi N. Thakar, Amin M. Vahdat and Ronald P. Doyle—"Managing Energy and Server Resources in Hosting Centers"—Oct. 2001—pp. 1-14.

* cited by examiner

AUTOMATED SYSTEM ADAPTATION TECHNIQUE PARTICULARLY FOR DATA STORAGE SYSTEMS

FIELD OF THE INVENTION

The present invention relates to the field of design, configuration and maintenance of data storage systems and other types of computer systems, networks and subsystems. More particularly, the present invention relates to a programmatic technique for developing, configuring and maintaining such systems.

BACKGROUND OF THE INVENTION

Due to the number and variety of components included in complex computer systems, networks and subsystems, and due to the large number of different ways in which their components may be configured and operated, they can be difficult to manage. Data storage systems are a particular example.

Disk arrays are a common building-block component of data storage systems. Enterprise-scale data storage systems can contain, for example, a hundred or more disk arrays. Typically, a disk array has one or more controllers, a plurality of hard disk drives and cache memory. The flow of data via buses and other communication channels among networked computer systems and the elements of the disk array is directed by the controllers. The cache memory is used for temporary data storage to reduce the number of disk accesses. Other elements of a disk array can include parity calculation engines, direct memory access (DMA) engines, bus bridges, communication adapters for buses and external networks, and so forth.

Large-scale computer data storage systems having many disk arrays are often difficult to design, configure and manage. The scale of these systems, numerous design and configurations choices, and lack of information about workload behaviors raise numerous challenges. And, while there is an increasing demand for larger data storage capacities, more predicable performance and faster deployment, there is a shortage of skilled administrators of such systems.

It is often difficult to predict the behavior of a storage system. This is due, in part, to the complexity of the system itself, the wide variety of workloads that may be placed on the system, and changes that can occur in the workloads. For example, a workload that requires accesses to disk locations that are generally sequential can be performed more efficiently than a workload that requires a significant amount of disk head repositioning to access random locations. Further, data flows can significantly affect each other, and, thus, the performance of the storage system. For example, if performed concurrently, two highly sequential data flows can result in significant disk head repositioning activity while switching between the flows.

Traditional techniques for storage system development, configuration and maintenance are largely ad hoc. As a result, large scale storage systems are time-consuming and expensive to implement. Typically, a system is initially designed and configured using estimations of current and future requirements for bandwidth and I/O operations per second (IOPS). These estimations are based on rules of thumb, intuitive knowledge of the applications to be served and measurements taken from existing storage systems.

Once the hardware is selected, there are numerous configuration options. Administrators are, again, guided by intuition and rules of thumb. In mapping applications to hardware devices, for example, the data is stored in accordance with RAID level 1 ("RAID" refers to Redundant Arrays of Inexpensive Disks) if the related workload is I/O intensive; otherwise, RAID level 5 is used. Because many of the parameters are interdependent in non-intuitive ways, implementing such a system can be tedious and error-prone. Rarely will an initial configuration result in a satisfactory solution. Thus, once the storage system is operational, it is usually necessary to experiment with different hardware options and arrangements of the data. Of course, budgetary constraints play a large role in limiting the adminstrator's ability to purchase sufficient storage hardware and to experiment with a variety of configurations. As a result of these complexities, the implementations of large-scale storage systems are often behind schedule, over-budget and under-provisioned.

Therefore, what is needed is an improved technique for the configuration and management of complex computer systems, networks and subsystems that does not suffer from the aforementioned drawbacks. More particularly what is needed is such a technique for large-scale storage systems. It is to these ends that the present invention is directed.

SUMMARY OF THE INVENTION

The invention is an automated system adaptation technique for computer systems, networks and subsystems generally and, more particularly, for data storage systems. The invention programmatically designs, configures and manages a system, such as a data storage system. This is accomplished by automatically performing a sequence of steps in an iterative loop, including analyzing the operation of the system under a workload, generating a new design based on the analysis and migrating the existing system to the new design. By "automatically," what is meant is that the loop is performed substantially by computer hardware and/or software and can be implemented entirely in this manner. By systematically exploring a large design space and developing designs based on analyses of the workload, the invention generates designs that are improved in comparison to conventional design techniques. By programmatically repeating these tasks, the invention causes the system to converge to one that supports the workload without being over-provisioned.

In one aspect of the invention, a method for adaptation of a computer system, network or subsystem is provided. A design for the system is developed. An automated loop is performed that includes implementing the design; analyzing operation of the design after implementing it; and modifying the design based on results of the analysis. The system may be, for example, a data storage system, a CPU farm, a data caching system or a database system in which database indices are modified.

Models of components of the system may be formed and results of the analysis applied to the models, indicating the utilization of components of the system. Modifying the design may be performed in response to the utilization measures. These and other aspects are described in more detail herein.

DETAILED DESCRIPTION OF A PREFERRED EMBODIMENT

1. OVERVIEW

Figure 1:
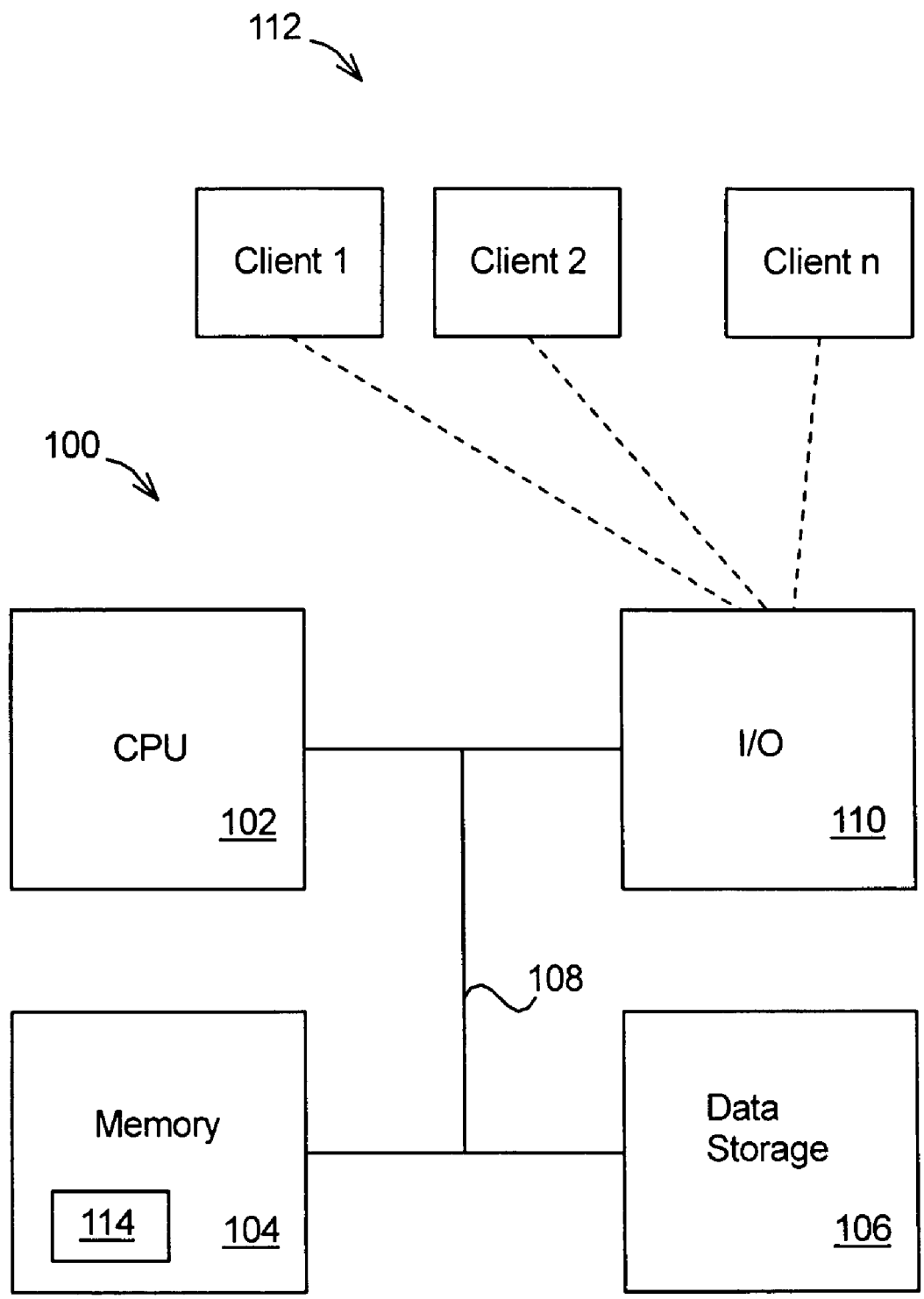
FIG. 1 illustrates a general-purpose computer system by which the present invention may be implemented.

FIG. 1 illustrates a block schematic diagram of a computer system 100 by which the present invention may be implemented. The computer system 100 may include a general-purpose processor 102, memory 104 (e.g., RAM and/or hard disks), data storage 106 (e.g., including one or more disk arrays), a communication bus 108, and input/output devices 110, such as a keyboard, monitor, mouse and network interface. The computer system 100 is conventional. As such, it will be apparent that the system 100 may include more or fewer elements than shown in FIG. 1 and that other elements may be substituted for those illustrated in FIG. 1.

The computer system 100 may function as a data storage system. Accordingly, the system 100 may store data generated by a number of networked clients systems (e.g., workstations) 112. The data may be stored, for example, in the data storage 106. One or more software programs 114 for implementing aspects of the present invention may be stored in the memory 104.

Figure 2:
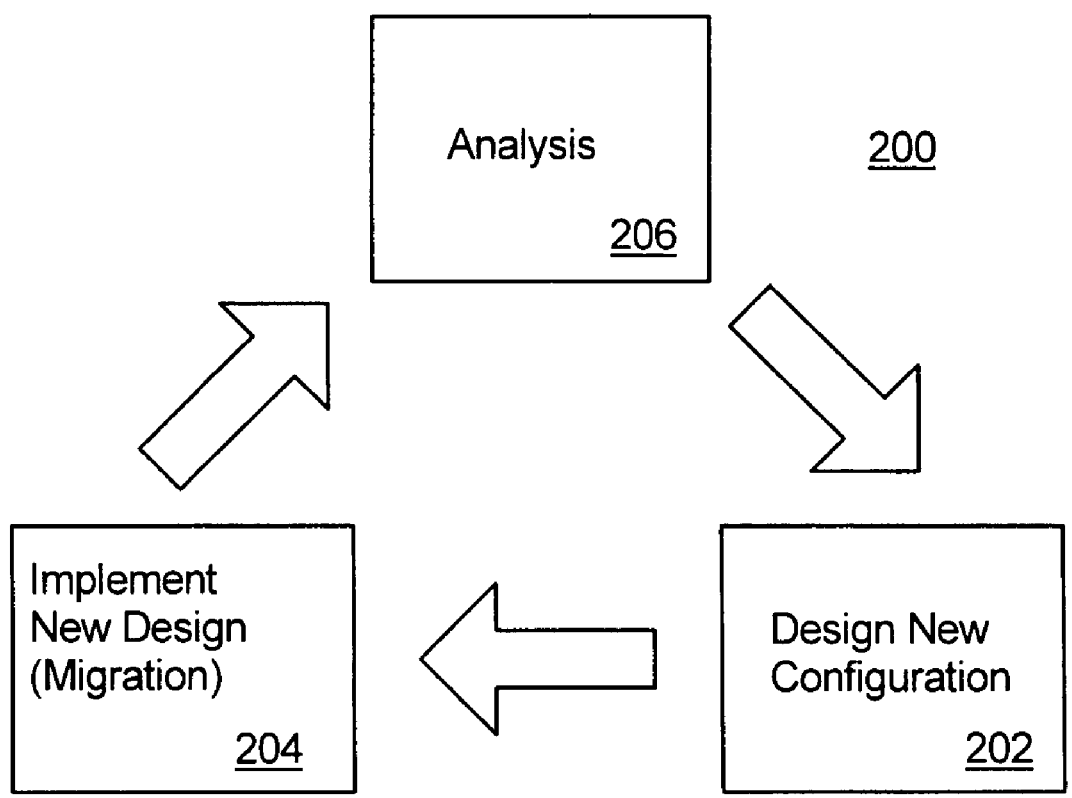
FIG. 2 illustrates an iterative loop process for data storage system configuration and management in accordance with the present invention.

FIG. 2 illustrates an iterative loop process 200 for configuration and management of the data storage system 100 of FIG. 1 in accordance with the present invention. The loop includes a design stage 202, a migration stage 204 and an analysis stage 206. The design stage 202 generates a design for the storage system 100, including, for example, the number and type of storage devices to be used, logical arrangements of the devices, mapping of data to the devices and configuration of the devices. The design may also include specific manufacturers and model numbers of devices, layout and size of logical volumes, RAID levels to be employed, numbers of disks for RAID sets, and so forth.

Assuming that the storage system 100 is being implemented from scratch, the process may begin in the design stage 202. For example, expected storage capacity requirements of the application software that is to operate on the client systems 112 or the host system 100 can be used as a starting point to determine the number of disk drives or other storage components to be included in the storage 106. An initial estimate may be made by a system administrator regarding bandwidth and other performance requirements that may need to be met. Further, an existing design of a storage system employed under similar circumstances may provide guidance (for the initial estimates).

The migration stage 204 generally includes implementing the design developed in the design stage 202. This may include, for example, obtaining (e.g., purchasing or allocating from an available pool) the actual devices identified in the design stage 202, configuring them as specified by the design stage 202 and moving the data to locations indicated by the design stage 202. The migration stage 204 may be divided into aspects: a first for planning the migration, and a second for executing the plan. The steps of configuring the devices and moving the data may be performed sequentially, concurrently or in an interleaved fashion.

The analysis stage 206 characterizes the behavior of the system 100 while operating under a workload. As used herein with respect to a data storage system, a "workload" is any set of I/O accesses (also referred to as "requests"). Determining the workload generally involves obtaining a trace, which is a record of disk I/O events, and then developing a workload characterization based on the trace. The characterization can be thought of as a summary of the trace and includes a number of parameter values (also referred to as "attributes") that are computed from the trace. These attributes can include, for example, average request sizes and the rates at which the requests are made. From the analysis stage 206, the loop 200 returns to the design stage 202.

The design stage 202 may include both a modeling aspect and a solver aspect. The modeling aspect applies the workload characterization obtained from the analysis stage 204 to performance models of components, such as disk arrays, of the system 100. As a result, the modeling aspect may determine how well the components are being utilized by the current design. For example, a particular disk array may be identified as underutilized based on a comparison of its actual workload (e.g., obtained from the workload characterization) to its capabilities (e.g., obtained from its model). Based on the utilization, the solver aspect of the design stage 202 modifies the design in an attempt to obtain more optimal utilization of the components of the system 100. This may include adding or removing components of the system 100 and reassigning data among the components of reconfiguring the components.

As a more particular example, assume that in the analysis stage 206, a parameter indicative of the I/O bandwidth utilized for a particular disk array is compued from the I/O trace. By applying this parameter to a model of the disk array in the design stage 202, it may be determined how well the disk array is utilized. The modeling aspect may then determine whether the disk array is overloaded or underutilized and by how much. For example, the parameter may be compared to a known maximum bandwidth for the disk array (e.g., determined experimentally or from manufacturer specifications). If the disk array is overloaded, another disk array may be added to the design to share the workload. Alternately, assuming it is determined that a particular disk array is overloaded and that another disk array is underutilized, the design stage 202 may then modify the design to balance the load between the two disk arrays.

2. ANALYSIS STAGE

The analysis stage 206 obtains a trace from the system 100 as it operates under a workload. The workload may be a real workload or a synthetic workload that is representative of an expected real workload. The trace is a record of I/O events which occur during a given time period. A software script which operates on the system 100 may generate the trace file by recording each I/O event which occurs for each storage device included in the system 100. Alternately, the trace may be collected at the disk arrays or storage area network (SAN), which would be useful in a system having multiple hosts. Thus, each time a disk is read from or written to, a record is added to the trace file. The record may include, for example, a device number, a block number, an indication as to whether the event was a read or write request, a request size and an indication of the time at which the event occurred. It is expected that generating the trace record will only marginally interfere with operation of the system 100 (e.g., occupying approximately 2% of processor 102 overhead). The quality of results of the process 200 will depend, in part, upon accurate collection of I/O events and, thus, skipping I/O events is preferably avoided.

The trace file may be generated in any known I/O trace file format. For example, the trace file may have a machine-specific or a machine-independent binary format or may be formatted as ASCII text.

Figure 3:
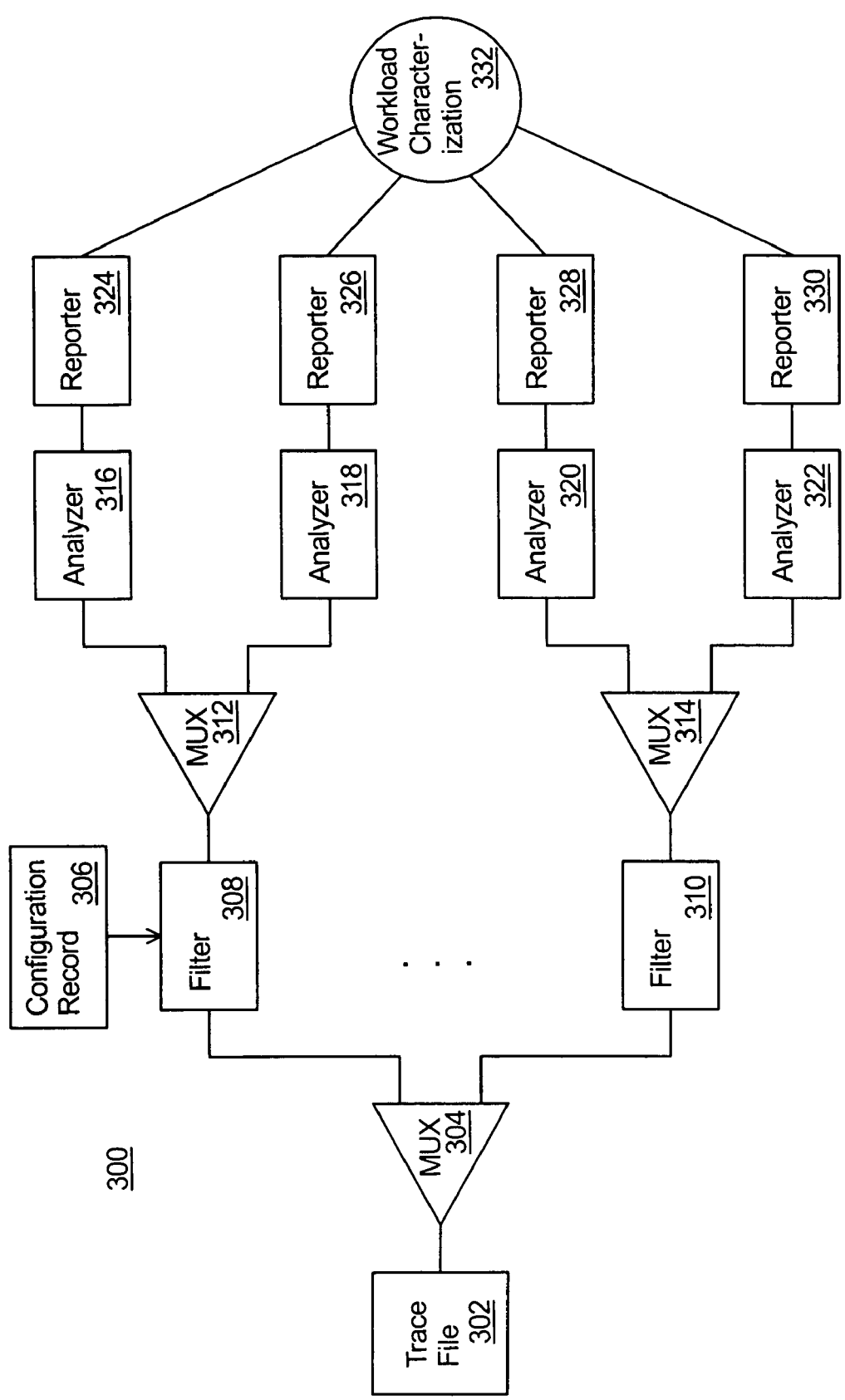
FIG. 3 illustrates an exemplary data flow for developing a workload characterization from an I/O trace in accordance with the present invention.

The trace file is then processed into a workload characterization. The workload characterization is essentially a summary of the trace and, thus, it summarizes the behavior of the system 100 operating under the workload. FIG. 3 illustrates an exemplary data flow 300 for developing a workload characterization from an I/O trace file 302. The data flow 300 specifies operations that may be performed during the analysis stage 206, such as by a general-purpose processor (e.g., the processor 102 of FIG. 1), or by specialized hardware, firmware or a combination thereof. The trace file 302 may be stored, for example, in the memory 104 of FIG. 1.

The analysis stage 206 includes several types of operations, shown as objects in the data flow 300 of the FIG. 3. These objects include: multiplexers, filters, analyzers and reporters. Multiplexers read trace records and divide these into multiple outputs. For example, the multiplexer 304 reads and trace file 302 and separates the file 302 into individual flows (also referred to as "streams").

Typically, each storage device or logical arrangement of physical storage of the system 100 has an associated data flow that includes the I/O operations directed to that particular device. Logical unit (LUs) as used herein, means a logical arrangement of physical storage which may include a fraction of a hard disk, multiple whole disks, an entire disk array, multiple disk arrays or anything in between. A logical volume (LV) is a logical arrangement of associated data that may be distributed among a plurality of physical storage devices. A logical unit or a logical volume may, for example, be assigned to a particular application served by the data storage system 100.

In order to perform their functions, objects of the analyzer stage 206 (FIG. 2) may require information regarding the current configuration of the data storage system 100, such as details of the structure of physical devices (e.g., disks and disk arrays) and the logical arrangements of those devices (e.g., LUs and LVs). This information is provided to the analysis stage 206 (FIG. 2) as a configuration record 306 which may be stored in memory 104 (FIG. 1) along with the trace file 302.

As shown in FIG. 3, the multiplexer 304 replicates the trace file 302 into multiple identical flows. Each of these flows may be applied to one or more filters or analyzers, as desired.

The filter objects of the analysis stage 206 read a stream of trace records and output selected records from the stream based upon the operation specified for the filter. A filter may, for example, separate records based on whether they occur during a specified time period, whether they represent a read or a write request, the location or address to which the request is directed, a device number, a request size, a logical volume and so forth. It will be apparent that these or other criteria may be used by any of the multiplexers or filters.

In the exemplary embodiment of the data flow 300 of FIG. 3, a first output flow of the multiplexer 304 is applied to a filter 308, while a second output flow of the multiplexer 304 is applied to a filter 310. The filters 308, 310 may, for example, filter the trace records in each flow for I/O events that are directed to a particular set of disk blocks that form a RAID set. From the filter 308, the first flow may be applied to a multiplexer 312, while the second flow may be applied to a multiplexer 314. From the multiplexers 312, 314, the trace records may be applied to analyzer objects 316, 318, 320, and 322.

Analyzer objects read records, analyze fields in the records and provide results of their analysis. The analysis typically includes forming a parameter value that characterizes or summarizes multiple trace records, such as through statistical methods. An analyzer may, for example, compute a statistical mean of request sizes or a mean time between requests. As another example, an analyzer may determine which percentage of requests fall into various request-size "bins." As still another example, an analyzer may compute a cumulative total of write operations to determine how much storage space is being consumed by a particular flow. The filters of data flow 300 separate the data records into flows based on information contained in the configuration record 306. For example, the configuration record 306 may indicate which blocks of specified physical devices are associated with a particular LU. In which case, the filter 308 may select records of the trace file 302 that are directed to those particular blocks to separate the flow for that particular LU from the other records in the trace file 302. For simplicity of illustration, the configuration record 306 is shown in FIG. 3 as input only to the filter 308. However, it will be understood that any object in the data flow 300 may perform its functions based on information in the configuration record 306.

As shown in FIG. 3, the outputs of the analyzers 316, 318, 320 and 322 are applied to reporter objects 324, 326, 328 and 330, respectively. Reporter objects receive results of analyzers and provide these results in an appropriate format. For example, the results of the analysis stage 206 (FIG. 2) are used by the design stage 202 (FIG. 2). Accordingly, the reporter objects 324, 326, 328 and 330 may provide the results of the analyzers 316, 318, 320 and 322 in a format expected by the design stage 202. This may be, for example, XML, ASCII text or in a format developed by Hewlett-Packard Company, known as "Rome". The workload characterization preferably includes the outputs of all of the reporters. Accordingly, the outputs of the reporters 324, 326, 328 and 330 are shown in FIG. 3 as forming a workload characterization 332. As mentioned, the workload characterization includes a set of attributes which characterize the workload applied to the storage system 100 (FIG. 1).

It will be understood that the arrangement of objects and elements of FIG. 3 is exemplary and that the flow 300 may include a different arrangement, depending upon the circumstances. For example, only two outputs of each multiplexer are shown for illustration purposes, though it will be apparent additional outputs may be provided for any one or more of the multiplexer, depending upon the circumstances. Further, it will be apparent that other techniques may be used for characterizing system performance.

3. DESIGN STAGE

As mentioned, the design stage 202 generates a design for the storage system 100 and may include both a modeling aspect and a solver aspect. The modeling aspect applies the workload characterization 322 (FIG. 3) obtained from the analysis stage 204 (FIG. 2) to performance models of components, such as disk arrays, of the system 100. As a result, the modeling aspect may determine how well the components are being utilized by the current design. Interpolation-based, analytical or other modeling methods may be employed in accordance with the modeling aspect of the invention.

Forming an interpolation-based model of a system component, such as a disk array, involves developing one or more tables of values for the component which characterize its performance under various configurations and workloads. Once the component is modeled by the tables, the utilization (e.g., under the workload indicated by the analysis stage 206) needed by the solver aspect of the design stage 206 may be predicted by interpolation within the values found in the table. The resulting performance may then used by the solver aspect to improve the design. For a disk array, the input values can include various configuration parameters, such as RAID level, the number of disks in a RAID group and so forth. Other input values are representative of the workload, such as a summary of request patterns or streams, including request type (read or write), request size, sequentiality of requests, average queue length, and so forth. Resulting performance outputs of the table may, for example, provide a binary or yes/no indication, such as whether the component is overloaded or underutilized, and provide a value for performance parameters, such as request throughput or latency.

Figure 4:
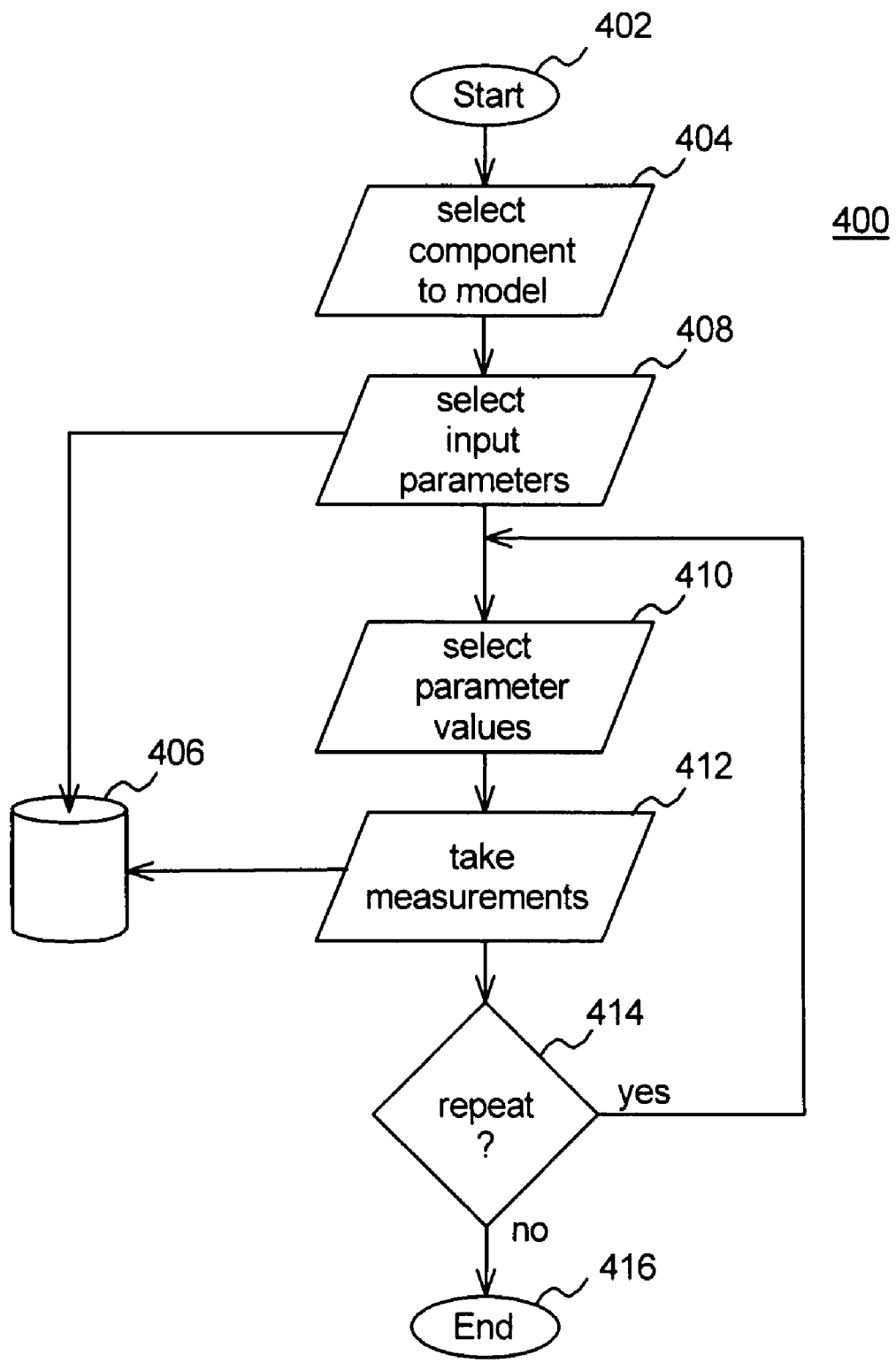
FIG. 4 illustrates a flow diagram for forming a table-based model in accordance with the present invention.

FIG. 4 illustrates a flow diagram 400 for forming a table-based model in accordance with the present invention. Steps of the method disclosed by the flow diagram 400 may be performed under control of a human operator by a general-purpose processor (e.g., the processor 102 of FIG. 1 or another processor), or by specialized hardware, firmware or a combination thereof.

From a start state 402, program flow moves to a state 404, in which a component that is to be modeled is selected. For example, a sample disk array having a particular model number from a particular manufacturer and/or having a particular software version level may be selected to be modeled. Measurements are taken from a physical sample of this component, as explained in more detail herein. Accordingly, the selected component is treated as representative of a set of disk arrays, such as all those having the same manufacturer model number and software version. Measurements may be taken from multiple sample components to ensure that the measurements are representative. A table file 406 may be initialized for the component for storing the modeling data for the component. The table file 406 may be stored, for example, in the memory 104 of FIG. 1.

Because a particular component is selected in the state 402, it will be apparent that the method of FIG. 4 may be repeated for each component to be modeled. Further, the method of FIG. 4 may be used to model (or to validate a model) of a complete system or portion thereof.

From the state 404, program flow moves to a state 408, in which various input parameters may be selected. These may include configuration parameters (e.g., RAID level) and workload parameters (e.g., request size). The selected parameters may then be entered into the table file 406 for the component. For example, the input parameters may be values that will appear as headings for rows or columns in the table file 406. Note that tables formed for the component may have two, three, four or more dimensions depending upon the number of input parameters.

Program flow then moves to a state 410 in which the particular values may be selected for the parameters selected in the state 408. For example, if RAID level is selected as a configuration parameter in state 408, then RAID level 5 may be selected in the state 410. As another example, if sequentiality is selected in state 408 as a workload parameter, a real or synthetic workload having a particular value of the sequentiality may be selected for the component in the state 410.

From the state 410, program flow moves to a state 412, in which the values selected in the state 410 may be applied to the component and performance measurements may be taken from the component. For example, a value, such as the request throughput (e.g., the number of requests processed per second), may be measured under applied parameter values. As another example, a binary indication, such as whether the component is capable of satisfactory operation under the applied parameter values, may be determined. Results of measurements taken in the state 412 may be stored in appropriate locations of the table file 406.

From the state 412, a determination may be made as to whether the measurements should be repeated for different parameter values. Assuming so, then program flow returns to the states 408 and 410 where the values of the input parameters may be changed or different input parameters may be selected. For example, requests may be applied one after the other, as quickly as the component will handle them, or at a rate that is gradually increased until the component is no longer able to keep up, to determine a maximum request rate for the component. Then, a configuration parameter may be changed (e.g., RAID level 5 to RAID level 1) and the process repeated to determine the maximum request rate under different conditions. As a result, maximum request rate throughputs for the component under various operating conditions may be determined.

Once sufficient measurements are taken, program flow may terminate in a state 416. It may be desired to obtain arbitrary values that occur between measurement points, such as during the design stage 202 (FIG. 2). These values may be estimated from the measured values. As the number of measurements is increased, the accuracy of estimation also tends to increase. However, a trade-off for increased accuracy is the effort required to take additional measurements. Generally, the number of measurements taken may be decreased where the measured values change slowly as parameters are changed (i.e. the rate of change is relatively low) and increased where measured values are changing rapidly. In this way, the number of measurements needed is minimized and accuracy is maintained.

For some parameters, such as RAID level, number of disks in a RAID group, and so forth, it may be difficult to estimate values at intermediate measurements points. For example, measurements taken for RAID level 5 and for RAID level 1 will not generally be predictive of values for RAID level 3. Accordingly, a separate group of measurements may be created for each such parameter. Each such group may form a separate table for the component.

For estimating values between measurement points for other parameters, a number of computational techniques may be used. For example, assume it is desired to estimate an unknown value (p4) for a point p=(p1, p2, p3, p4) for a component where p1 represents request size, p2 represents sequentiality of requests, p3 represents request queue length and p4 represents request throughput. One technique for estimating a value at a target point p is to select the value of its nearest neighbor. For example, the Euclidean distance between the point p and other points in the table may be computed. Thus, by using known values for the target point p, such as the values of p1, p2, p3, the value of an unknown performance parameter, such as request throughput p4, may then be estimated to be equal to the measured value at the closest neighboring point to the point (p1, p2, p3).

Figure 5:
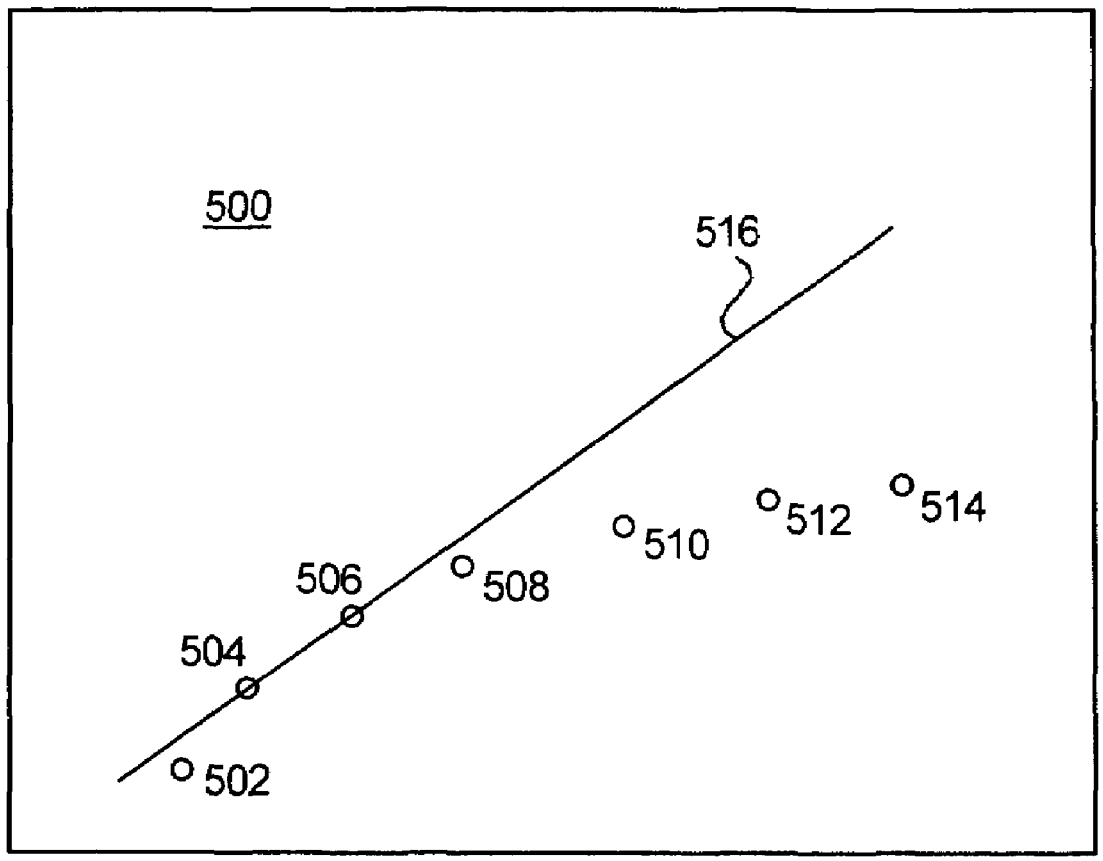
FIG. 5 illustrates a graph in which an unknown value of a target point for a table-based model is estimated from values of neighboring points in accordance with the present invention.

Another technique for estimating a value at a target point is by choosing a set of nearby points, forming a line, a plane, or a hyperplane if there are more than three dimensions, through the nearby points, and using the line, plane or hyperplane to estimate an unknown value at a target point. FIG. 5 illustrates a graph 500 in which an unknown value of a target point for a table-based model is estimated. While the graph 500 is two-dimensional, and thus represents a two-dimensional table-based model, it will be understood that the same technique may be extended to table-based models of three or more dimensions.

Assume that values of a first parameter are represented by the x-axis and values of a second parameter to be predicted are represented by the y-axis in FIG. 5. Assume also that the value of the first parameter at the point 502 is known, the value of the second parameter is unknown and that both values are measured at the points 504, 506, 508, 510, 512, and 514 and, are thus, known. Nearby points 504 and 506, one per dimension of the table, may be identified and selected. Next, a line, plane or hyperplane, depending upon the number of dimensions, may be computed that passes through the selected points. This is shown by the line 516 in FIG. 5. Then, the estimated value is selected as a value in the hyperplane that occurs at the known value of the target point 502. As shown in the example, of FIG. 5, the estimated value would be directly above the point 502. This estimated value is slightly too high (since the line 516 passes above the point 502). It will be apparent that other estimation techniques could be used to determine the value of unknown parameters based on the measured values.

Further, to improve accuracy, the values of p may be restricted to ranges of values of measured points. For example, assuming measured queue length values all fall between 8 and 64 and that an estimated value for p3 would fall below 8 using an estimation technique. Accordingly, the estimated value may be set to 8. Similarly, if the estimated value for p3 would be greater than 64, then its value is set to 64. In the example of FIG. 5, since the point 504 is the lowest along the y-axis of all the measured points, the value for the point 502 may be set to the value at the point 504, which is the lowest measured value for that parameter. In which case, the estimated value would be too high since it would then fall above the actual location of the point 502.

As mentioned, rather than table-based models, analytical models may be employed for the modeling aspect of the design stage 202 (FIG. 2). Analytical modeling takes advantage of the fact that different array types or user-proposed physical models are composed of similar individual parts, devices, or subsystem units, also referred to generically as "components," and that different array types often have similar structures or substructures.

Figure 6:
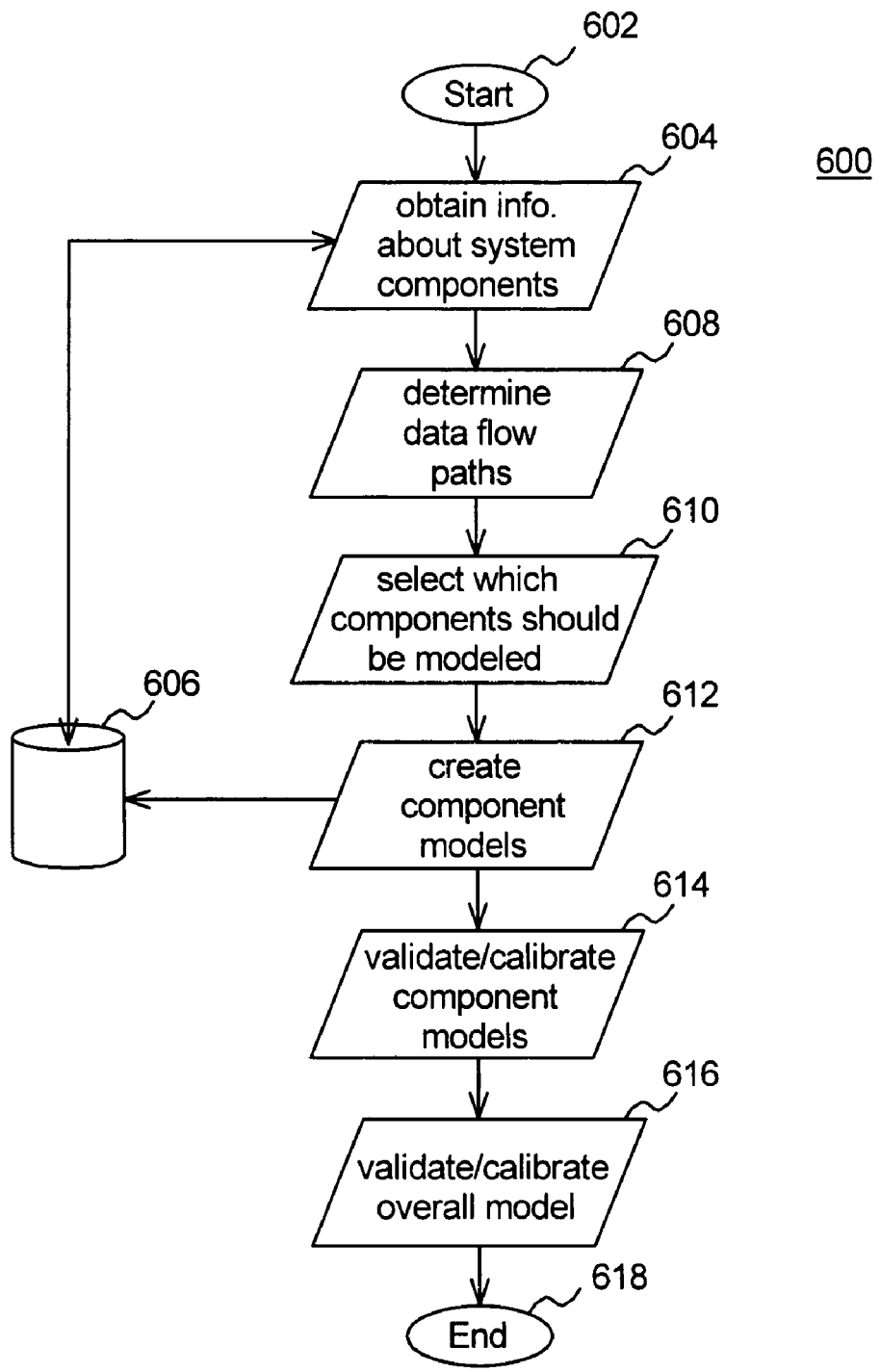
FIG. 6 illustrates a flow diagram for building and utilizing an analytical model of a computer storage system in accordance with an embodiment of the invention.

FIG. 6 is a flowchart of an overall process 600 of building and utilizing an analytical model of the computer disk array storage system 100 (FIG. 1), according to an embodiment of the invention. The process 600 begins in a start state 602 and moves to a state 604 in which information about components of the system 100 is obtained. Information about the components of a disk array might be obtained from the vendor who built or sold the disk array, by inspecting the hardware, or from performance measurements. Performance data regarding most components of the system—namely controllers, cache memories (e.g., random access memory integrated circuits (RAM)), buses and other interconnects, individual disk drives, or any other device or sub-device of interest to a system designer as a potential workload bottleneck—may also be available from the original equipment manufacturers (OEM). For example, OEM documentation typically lists the following performance specifications for an individual disk drive: seek time, rotational latency, mean time between failures (MTBF), peak transfer bandwidth, and the like, as would be known to those skilled in the art.

Note that although some components may be physically inseparable (e.g., cache memory may be permanently installed in a controller), the process 600 can treat them as separate components, based on prior knowledge of how to best partition the system 100.

The component information may have been obtained previously and stored in a component database 606, in which case the obtaining step 604 preferably retrieves the information from the component database 606. If the information is obtained for the first time during the obtaining step 604, then it is preferably stored in the database 606 for subsequent use.

The process 600 determines (608) data flow paths between the components. Like component specifications, this interconnection information might be obtained from the vendor who built or sold the disk array, from inspection of the hardware, or from knowledge of how LUs are configured. A given system may have different sets of data flow paths for different LU configurations, as the LU configurations may change dynamically. Though not illustrated in FIG. 2, the data flow paths determined in step 608 optionally may be retrieved from or stored in the component database 606 or a separate database that contains interconnection data.

The process 600 next selects (610) which components should be modeled. Any element or part or subpart of the system 100 having sensible individual performance specifications and material relevance to the overall system performance characteristic of interest can be modeled or sub-modeled.

The structure of the model preferably resembles the structure of the system 100. Only those physical components of the system 100 that are material to the relevant performance characteristic(s) of the system 100 have an analog in the model. In other words, the model is "morphological" with respect to the system 100. However, the model structure and real system structure may differ in some respects. For example, as a guideline in performing the selecting step 610, one would typically utilize a separate component model (e.g., "analog") for each system 100 functional unit that stores, transforms, or transfers data in order to service accesses issued by host or client computers 112 on data in the array of disks. This guideline implies component models are employed for caches and disks, but not for power supplies or front panel lights.

The component models usually form a directed acyclic graph, meaning that any path starting at the top of the model ends after passing through a finite number of component models, when traveling in the direction of the data flow.

The selecting step 610 is preferably performed by a knowledgeable human. In extreme cases when a component model cannot be created (see discussion of step 612 below) or can be created only with great difficulty, then the selecting step 610 can omit that component from the model. This is a standard tradeoff between complexity and accuracy.

After the selecting step 610, the process 200 next creates (612) models for each component determined to be part of the overall model during the selecting step 610. An objective of the creating step 612 is to characterize each component model's constraint(s) and/or workload specification transformation characteristics. The sources of this information are various, including, for example, vendor/manufacturer specifications and measurements from performance experiments. If a similar component has been studied before, the same or similar experimental design may be reused to determine the characteristics of the component model.

Optionally, the creating step 612 may interface with the database 606 to retrieve the same or similar component models. If the same component model has been characterized before and stored in the database 606, the creating step 612 need only retrieve that model from the database 606. If a similar component model (e.g., within the same family of generic components) has been characterized before and stored in the database 606, then the creating step 612 can retrieve that model from the database 606 and modify it as necessary. If the result of the creating step 612 is a new component model, the creating step 612 preferably stores the component model in the database 606 for later use, unaltered or modified, as a whole component model or a sub-model of a component. A component model may be a composite of sub-models.

Although FIG. 6 illustrates that the obtaining step 606 and the creating step 612 interface to the same database 606, separate databases for component information and component models could also be utilized.

The database 606 (or something similar) enables model reusability. In the construction of networked systems using commercially available, off-the-shelf components, it is common to encounter the same or similar components in different arrays. Because of model reusability, the process 600 becomes increasingly more powerful and easier to use as it builds upon a growing database of known component models.

The creating step 612 characterizes each component model as a constraint(s) and/or workload specification transforms. A constraint is a limit, requirement or threshold representing a maximum, minimum or other capability of the component being modeled. A constraint may be embodied as a simple number, a formula or an algorithm for evaluation. Some constraints are relatively simple. For example, the constraint for a port/cable model is likely to be a maximum total bandwidth (e.g., less than 100 megabytes per second (MB/s)). Either the workload meets the 100 MB/s requirement or not. Often, many constraints are substantially more complex. For example, an individual disk drive is likely to comprise several constraining factors, each of which sets limits on quantities (e.g., read-write actuator movement including seek and settling time). During execution of the model, a component model with a constraint evaluates whether its input workload(s) violates its constraint(s).

Each model component, except the ones having no outgoing flow, can also potentially include a workload specification transform (more simply called just "transform" or "transformation" or "transformer"), meaning that the model component's output workload specification(s) is a split and/or modification of its input workload specification. Each component comprises at least one constraint and/or one or more transforms. A transform can be specified, for example, as a simple percentage value or a formulistic division. One example of a transform is in bus models, which model communication buses in part by a splitting workload transform in that the total data traffic carried on a bus is distributed among multiple disk drives. The distribution is determined by some protocol and/or statistical parameters. As another example, a cache memory may be modeled in part by a transform to capture the fact that the cache manipulates data flow. In the steady state, the cache services some percentage of a host computer's data accesses, while only the remaining data accesses are forwarded to the disk drives. As well as altering the volume of data traffic, the cache also alters certain other qualities of the data traffic. For example, the cache might pre-fetch extra data in blocks, in anticipation of sequential accesses by the host. If this behavior is significant to the particular aspect of the performance to be predicted, then the cache model should include this transform.

During execution of the model, a component model with a transformation operates upon its input workload specification to produce output workload specification(s), in accordance with the component model's transforms.

The process 600 next preferably validates (614), and if necessary, calibrates, each individual component model. The validating/calibrating step 614 is optional, though it is good practice and recommended to ensure accuracy. The validating/calibrating step 614 for a particular component model involves applying to the component model an input workload for which the (real) component's behavior is known or tractable. The component model then operates on the input workload. The component model's output workload and constraint evaluation results are then compared to the known results to determine the magnitude of mismatch. If the mismatch is too large, then the component model's parameters can be calibrated and/or its transforms can be altered in an attempt to decrease the mismatch.

After validating and calibrating individual component models, the process 600 preferably validates (616), and if necessary, calibrates the overall model. Like the validating/calibrating step 614, the validating/calibrating step 616 is optional, though it is good practice and recommended to ensure accuracy. The validating/calibrating step 616 can be performed similarly to the validating/calibrating step 614. A workload for which the overall system's performance is known is applied to the topmost component model(s) of the overall model, and the model operates on the workload. The model's predictions are then compared to the known results to determine the magnitude of the mismatch. If the mismatch is too large, then the model's parameters can be calibrated to decrease the mismatch.

The validating/calibrating steps 614 and 616 can be performed over a range of workloads by successively applying different workload specifications to the component or overall model. The workloads may be predicted to stress the model by various predetermined amounts (e.g., 100% utilization). The resulting performance predicted by the model can then be compared to empirical data for the real system to determine the accuracy of the prediction. Or, a first workload specification can be tested through the model. If the model passes the test, a second (usually greater or more demanding in some sense) workload specification can be run through the model. If this second workload specification passes, the workload specification can be made more demanding again and again, recursively, until the system reaches a saturation point, where it is no longer able to satisfy the workload. If the model reaches saturation at a point sufficiently near where analysis or empirical studies show saturation of the real system, then the model is satisfactory.

As mentioned, each component model is either a constraint, a transform or both (e.g., where constraints and transforms are interleaved). The constraints and transforms are preferably ordered in accordance with data flow paths of the overall system being modeled. To execute the model, the workload is specified (from the analysis stage 206 (FIG. 2). Then, the constraints and/or transformations of the component models are applied to the workload, once for each data flow path of the system being modeled. The results are then reported. The results are typically an indication as to whether all of the constraints are satisfied or if any are not. The results can also include an indication of the level of utilization of the various components of the system being modeled. Mathematically, a component model can be considered a function, a workload is an argument of the function and the output is the value of the function at that argument. All or part of the modeling and performance prediction process can be performed by computer program.

The above-described analytical modeling technique is disclosed in U.S. patent application Ser. No. 09/843,390, entitled "Method and Apparatus for Morphological Modeling of Complex Systems to Predict Performance," filed Apr. 30, 2001, the contents of which are hereby incorporated by reference.

It will be apparent that modeling techniques could be used that differ from the table-based and analytical modeling techniques described above. It is expected, however, that the results of the loop process 200 will depend upon accuracy of the models. Overly optimistic performance models could result in the loop process 200 settling on a design that does not adequately support the workload. Conversely, overly pessimistic models could result in a design that is over-provisioned and, thus, more costly than necessary.

Based on the results of the modeling aspect, the solver aspect of the design stage 202 modifies the design. For example, based on utilization of the components of the system 100 indicated by the model, the solver aspect attempts to find a more optimal configuration.

The solver aspect of the design stage 202 assigns data stores to appropriately configured data storage devices. A data "store," as used herein, may be data storage space, such as a logically contiguous block of storage, striped data storage or concatenated data storage that is presented to an application (e.g., a software application). In practice, a store may be implemented as a logical volume (LV) into which data elements, such as files or a database, may be inserted, removed or manipulated. Each store may have a related stream or group of streams.

Each store and related stream(s) will generally have requirements, such as size or capacity, read/write bandwidth, read/write latency and availability. Because the stores are presented to applications, the requirements for the stores, such as capacity, number and other constraints, represent requirements of the storage system under design. These requirements can be derived from and/or altered by knowledge of the intended use of the storage system, such as from the nature and requirements of the specific applications it is intended to serve and from the results of the modeling aspect of the design stage 202 (FIG. 2).

Figure 7:
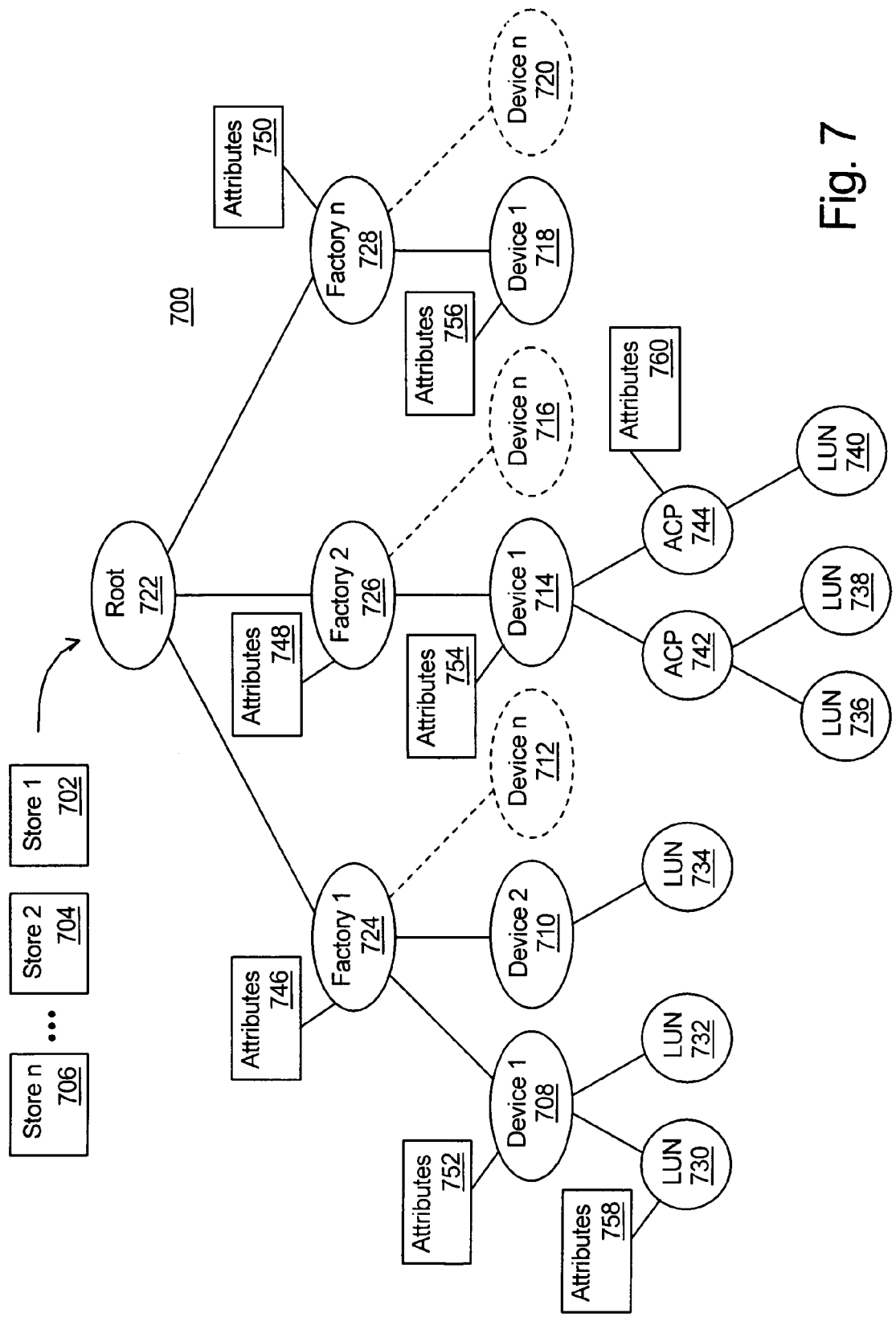
FIG. 7 illustrates diagrammatically a device tree data structure for a design solver in accordance with the present invention.

FIG. 7 illustrates diagrammatically a device tree data structure 700 in accordance with the present invention in which stores 702, 704, 706 are to be assigned to data storage devices 708–720 represented in the tree 700 and the devices 708–720 are to be configured. The devices 708–720 to be included in the storage system under design are represented by the device tree 700. The device tree 700 may itself be stored in computer memory as a data structure which is preferably hierarchical, though other data structures may be used, such as a list structure or "flattened" tree structure. A solver software program may implement the solver aspect of the design stage 202 (FIG. 1) by modifying the device tree data structure 700. For example, a general-purpose processor (e.g., the processor 102 of FIG. 1 or another processor), or specialized hardware, firmware or a combination thereof may implement the solver aspect.

The device tree 700 may include a representation of all of the devices and sub-devices currently existing in the design, as well as devices and sub-devices that may possibly be added to the design. For example, devices may be added by creating new nodes in the tree 700. As explained in more detail herein, other possible modifications to the tree 700 may include, for example, changing the type of disk drive of a particular device, increasing or decreasing the capacity of a device or disk, changing a RAID level or purchasing additional cabinets to allow for more disks. More generally, the types of changes that may be performed are determined by the possible configurations for the design of the storage system.

The device tree 700 has its origin at a root node 722. Branches from the root 722 may extend to a next level down in the hierarchy. Relationships between adjacent levels in the hierarchy can be considered as parent-child relationships. Thus, the root 722 in FIG. 7 is the parent of nodes 724, 726 and 728 at the next level down, whereas, the nodes 724, 726 and 728 are the children of the root node 722. While three children nodes are illustrated, it will be apparent that more or fewer nodes may be provided.

The nodes 724, 726 and 728 may each represent a device producer. A device producer may also be referred to as a "factory," which is a node in the tree 700 that is capable of creating new nodes as its children. The children 708–720 of the nodes 724, 726, and 728 may represent data storage devices, such as disk arrays. Accordingly, the nodes 724, 726 and 728 may each produce new devices as its children, as needed, during the storage system design and configuration process. While producer nodes need not actually manufacture new devices, they may, for example, represent the act of adding devices to the design for the storage system or purchasing new devices for the design.

The device factory 724 may, for example, produce a particular model of disk array such as the model designation "FC60" disk array available from Hewlett-Packard Company. Accordingly, the children 708 and 710 of the factory 724 may represent actual FC60 devices. Another child node 712 of the factory 724 may represent a "virtual" FC60 device. By "virtual" this means that the child 712 represents a particular FC60 disk array device that could possibly be added to the design, should the need arise, but that has not yet been added to the design. The ability to add devices to the tree 700 may be represented by factory nodes or by virtual nodes or by both. Further, in certain circumstances, requirements for the data storage system under design may include restrictions on the ability to add devices to the design, in which case, factories and virtual nodes may not be present in some or all of the branches in the device tree 700.

Data storage devices may contain or make available data storage capability referred to herein as LUs. A variety of different parameters, such as RAID level (e.g., levels 1 through 5), stripe size and number of disks used, may be associated with each LU. Further, the devices may have constraints and properties for associated LUs such as caching policies, pre-fetching policies, capacity, utilization parameters and limits on the number of disk drives that can be part of a device.

Accordingly, the storage devices 724–728 may have associated LUs 730–740. For example, LUs 730 and 732 may be associated with the device 708, while LU 732 may be associated with the device 710. Further, devices in the tree 700 may include sub-devices. For example, device 714 may be a disk array that includes multiple array controller processors (ACPs). For example, a pair of ACPs may be provided for fault tolerance or load balancing purposes. These may be represented in the device tree 700 of FIG. 7 by ACPs 742 and 744. Further, sub-devices in the tree 700 may have associated LUs. Thus, as shown in FIG. 7, the ACP 742 may be associated with LUs 736 and 138, while the ACP 744 may be associated with LU 740. Note that the use of LUs is not necessary as the assignment of stores may be made directly to the devices rather than to the LUs included in the devices. Assignment of the stores to the LUs, however, is useful to further specify in more detail the assignments of stores within the devices.

Associated with some or all of the nodes of the device tree 700 may be attributes 746–760. For example, factory 724 may have associated attributes 746 while the device 708 may have associated attributes 752. The attributes 746–760 may represent various properties of the elements of the device tree 700 such as the price of a particular device, the capacity of an associated LU or the utilization of SCSI buses attached to a device. The attributes for a factory may, for example, specify the type of device produced by the factory or a maximum number of devices the factory is capable of producing. Some attributes, such as those related to a communication bus, may be shared by multiple devices in the device tree 700, such as where the multiple devices share the communication bus. As another example, an attribute may be a constraint on the permissible configuration of the associated device. For example, a particular disk array may have a minimum and a maximum number of drives. It will be apparent that other attributes may be specified, depending on the circumstances. It will also be apparent that attributes may be obtained from and/or altered by various sources, including results of the modeling aspect of the design stage 202 (FIG. 2).

The attributes 746–760 in the tree 700 provide an interface to the device models for the solver software program. The solver uses the attributes of a node to determine whether the node may accommodate a particular data store. To accomplish this, the solver may compare the attributes of the node to the requirements of the store. In addition, where indicated, the solver may apply various functions to the attributes of a node so as to transform the node in some manner. For example, a function may be applied to a node that represents a physical data storage device or a node that represents a LU in order to modify the node to better accommodate a particular data store.

Available functions may be grouped into a number of classes. For example, the classes may include expansion functions and refinement functions. An expansion function may be one that expands the data storage capacity of a node. An example of one expansion function may be to use a drive that has more storage capacity and the same performance in a disk array represented by a node (e.g., node 708) in the tree 700, to increase storage capacity without increasing performance. Another example may be adding trays to a device for accommodating additional disks. Refinement functions may make changes to the performance of a node that increase some attributes while decreasing others. An example of a refinement function may be to replace one or a few large, slow disk drives with several smaller and faster disk drives. Another example may be to change RAID level 5 to RAID level 1 for a device or associated LU. While such a change would be expected to decrease capacity, it also would also be expected to increase the ability to handle small, random writes. These expansion and refinement functions may affect a single device, node or LU. Alternately, a function may concurrently affect multiple devices, nodes or LUs.

Another task of the solver is to assign stores (e.g., stores 702–706) to the devices (e.g., devices 708–720) and/or LUs (e.g., LUs 730–740) of the tree 700 based upon the requirements of the stores and upon the attributes of the devices and LUs in the tree 700. A possible assignment is one in which the requirements of the store are satisfied by the assigned device or LU and where the existence and configuration of the device or LU is consistent with stated goals (e.g., price and performance requirements) for the design of the data storage system.

Once an assignment or a transformation has been performed on a node, the solver then determines whether the new configuration of the node is improved in comparison to the configuration prior to the change or changes. If the new configuration is not improved, then the new configuration may be discarded. The solver may then backtrack to the prior configuration and try additional changes. However, if the new configuration is improved, then the new configuration may be adopted as the current configuration. Additional functions may then be applied to the adopted configuration with those that result in further improvement being adopted and those that do not being discarded. A record may be maintained of the various different configurations that have been tried to avoid unnecessarily re-trying the same or similar configuration.

The measure of whether a change to the device tree 700 represents an improvement over the prior configuration of the device tree 700 may be with reference to the stated goals or specifications of the data storage system under design. For example, if a goal is a low cost system, a change that reduces cost may be considered an improvement. However, if a change results in a modest cost savings and also a significant degradation in capacity or some other stated goal, then the change may not be considered an improvement. Improvements may also be measured against results of the modeling aspect of the design stage 202 (FIG. 2). For example, if the modeling aspect indicates that a particular device is overloaded, then an improvement would be a reduction in the load on that device. Thus, several different goals of different levels of importance may be input to the invention for the purpose of making the determination of whether a change is, in fact, an improvement. For example, goals may be given weights that represent their relative importance. Further, some goals may be designated as rigid. For example, an absolute limit may be placed on the cost of the data storage system. Thus, other constraints may be overrun to ensure that a not-to-exceed cost constraint is maintained.

As a more particular example of operation of the solver aspect, referring to FIG. 7, a first one of the stores (e.g., store 102) may be inserted into the device tree 100, such as at its root 122. The order in which the stores are inserted to the tree 100 may be pre-arranged into a specified order or may be in random order. For example, a pre-arranged order may be such that stores having larger storage capacity requirements may be inserted to the tree 100 before stores that have lower storage capacity requirements are inserted.

The store 702 may then be filtered down through the device tree 700 until it reaches a leaf (e.g., a device or LU node without children). This filtering may be accomplished by comparing the requirements of the store to the attributes encountered at each node along a branch within the tree 700. If the comparison indicates that the store is compatible, then the store may be passed along the branch until a compatible leaf is reached or it is determined that no compatible leaf exists on the branch. For example, the store 702 may be passed to the factory node 724 where attributes of the factory node 724 and/or its children 708 or 710 may be compared to the attributes of the store 702. If the comparison determines that one of the devices 708 or 710 is available and is compatible, then the store 702 may be passed to an appropriate one of the devices 708 or 710. Further comparisons of the requirements of the store 702 to attributes of the devices 708, 710 and/or LUs 730 and 732, respectively, may indicate that the store can be passed to one of the LUs 730 or 732.

Alternately, if no compatible node is found on the branch of the tree 700, then the search for an assignment for store 702 may backtrack up the tree 700 and one or more other branches tried in order to find a compatible node for the store. Further, an expansion or refinement function may be invoked at a node in order to modify the node into compatibility with the store. For example, if a capacity attribute of a node does not meet the capacity requirement of the store, an expansion function may be invoked at a device node to add capacity to the device as needed to accommodate the store 702. As another example, a factory node may add a device node to the design in order to accommodate the store. Thus, if a comparison at the factory 724 determines that neither device 708 or 710 is available for the store 702, but that a new device (e.g., a virtual device 712) can accommodate the store 702, then the device 712 may be added and the store 702 may be assigned to the device 712.

Once the store (e.g., the store 702) is added, one or more metrics may be obtained that are representative of how well the placement of the store meets the design goals for the system. Preferably, one metric is obtained for each stated design goal. For example, where a goal is to minimize the overall cost of the storage system, the metric may indicate the cost associated with the assignment. As another example, where access speed is a goal, the metric may indicate access times expected for the store as a result of the assignment. These metrics may then be stored for later comparisons.

A determination may also be made as to whether the store (e.g., store 102) placed in the device tree 700 was assigned for the first time or whether the assignment was a second (or subsequent) assignment of the store. This is to ensure that the store is placed in at least two different locations in the tree 700, if possible, so that its assignment can be optimized by choosing an assignment that best achieves the design goals for the system from among multiple possible assignments. Accordingly, if the store has been placed only once, then the store may be removed from the device tree 700, and re-inserted and filtered to a new location and metrics obtained for the new location.

Rather than placing the store in two different locations for comparison, the store may be assigned to the same location, but under different configurations. For example, a first assignment of a store may be to a device or LU configured to store the data in accordance with RAID level 1. A second assignment of the store may be to the same device or LU, but configured in accordance with RAID level 5. The solver may then compare metrics obtained for these two configurations.

Then, once at least two possible assignments have been made for the store and metrics obtained for each assignment, a comparison may be made between the metrics obtained for these two prior iterations to determine which best achieves the design goals for the system. Assignments which are not selected may be discarded.

A determination may be made as to whether another iteration should be performed. For example, this may result in locating a still-better assignment for the store. Assuming that another iteration is to be performed, the process repeats with the assignment of the store serving as a baseline for comparison to metrics obtained for a new assignment.

Once a store has been placed in the tree once, each additional assignment may be performed recursively in the manner described above. By starting the search for an appropriate location in the tree 700 for a next assignment at the same level of the tree as the previous assignment was found, a depth-first search or breadth search first may be performed. It will be apparent that other search techniques may be performed, such as simply re-inserting the store at the root 722 for each iteration. Further, any number of iterations may be performed. For example, a predetermined number (e.g., three or four) may be performed, or all possible assignments may be exhausted, before applying this process to a next store. Thus, assuming no additional iterations are to be performed for the store, a determination may be made as to whether all the stores 702–706 have been inserted into the tree 700 and assigned to a suitable device or LU.

Assuming not all of the stores have been assigned, a next store (e.g., the store 704) may be selected. For example, if the stores are to be inserted into the tree in a particular order (e.g., largest to smallest) then the next store in order may be selected. The next store may be inserted into the tree and the process of assigning the store to a position in the tree 700 may be performed.

Rather than assigning the stores to the tree 700, one-by-one, as described above, groups of stores or all of the stores may be inserted to the tree 700 together. At each node, comparisons may be made for each of the inserted stores to determine whether they are compatible or whether the node should be modified. One or more of the stores may be assigned to the node. Then, a next node may be selected and requirements of the remaining, unassigned stores compared to that next node. This process may continue recursively until all of the stores are assigned to the tree 700.

Assuming that it is determined that all of the stores have been assigned to the device tree 700 and the device tree 700 configured (using expansion or refinement functions) to accommodate each store, the data storage system may be ready to be implemented according to the present state of the device tree 700. In which case, the design process may terminate and the migration stage 204 takes over to implement the new design.

Once a design has been implemented, it may be desirable to repeat at least some portions of the above-described assignment and configuration process in order to determine whether a better solution may be achieved. For example, after the analysis stage 206 (FIG. 2), the solver may be applied again to the existing design in an attempt to improve the design. Thus, some of the stores may be removed from the tree and reassigned. During this process it should be noted that the order in which the stores were inserted into the device tree 700 may affect the eventual assignments and configuration of the tree 700 and, thus, the resulting design of the storage system. Accordingly, assigning at least some of the stores in another order may affect the resulting design. Thus, one or more of the stores may be removed from the device tree 700 and reinserted again at its root 722. For example, all of the stores assigned to a single storage device may be removed from the tree 700. While less than all of the stores for a single storage device may be removed, no storage device may be removed from the design unless it has no stores assigned to it. Accordingly, removing less than all of the stores for a device is not generally expected to result in a significant improvement to the design. However, doing so may improve the design with respect to other goals, such as load balancing. As another example, all of the stores assigned to multiple different storage devices may be removed from the tree 700. Further, if desired, all of the stores may be removed from the tree 700. A disadvantage of removing all of the stores is that it would be expected to take longer to assign all of the stores and the result is not expected to be significantly different than the case where fewer than all of the stores are removed. This disadvantage may be overcome, however, in some cases where the ordering of the stores is changed prior to reinsertion.

The above-described solver is disclosed in U.S. patent application Ser. No. 09/924,735, "Simultaneous Array Configuration and Store Assignment for a Data Storage System," filed Aug. 7, 2001, the contents of which are hereby incorporated by reference. It will be apparent that a solver technique could be used that differs from the techniques described above.

4. MIGRATION STAGE

Once a new design has been developed in the design stage, including for example, the type and number of components to be utilized, their configuration and the assignments of the data stores to the devices, the new design may be implemented by the migration stage 204 of FIG. 2. This includes, for example, adding or removing components from the data storage system 100, configuring newly added devices, reconfiguring existing devices, and moving the data stores to the their new assignments.

In a preferred embodiment, the migration stage 204 is performed automatically. For example, a number of devices may be physically and electrically connected to the system 100, but not allocated or assigned. For example, extra devices may exist as spares. When the design stage 202 develops a new design that requires additional devices, one or more of these unassigned devices may then be automatically assigned to perform an active role in the system 100, for example, by configuring the devices and allocating data to them. In another embodiment, or where appropriate unassigned devices are not available, adding and removing components and configuring the devices may be performed manually, such as by a system administrator. This task may be accomplished by the administrator simply placing the data storage system 100 (FIG. 1) in conformance with the design developed by the design stage. Because the administrator works from the developed design, this task is more easily performed than conventionally where the administrator has no such guidance. A technique for automatically configuring storage devices, which may be interleaved with the migration of data, is descried in U.S. patent application Ser. No. 09/755,891, filed Jan. 6, 2001, and entitled "Automatic Configuration of a Data Storage System."

When the adaptation process of the present invention is applied to a storage system (e.g., the storage system 100 of FIG. 1) in which useful data is stored, the data will generally need to be arranged in accordance with a new design for the storage system without the loss of any data. One technique for migrating data, such as logical volumes, from one arrangement to another is to copy the data to a second, redundant, data storage facility that is separate from the system 100 and then to copy the data back to the storage system 100 in accordance with its new arrangement. This technique has a drawback in that such an additional storage facility may not be readily available.

Another technique for rearranging the data provides for rearrangement of data in logical volumes without having to completely reconstruct the logical volumes.

A planning aspect of the migration stage 204 includes computing a plan for moving data objects stored on the system 100 (FIG. 1) from one configuration to another. Then, in accordance with a moving aspect of the migration stage 204, the data objects are physically moved to the new configuration in accordance with the plan. Both aspects may be performed by a general-purpose processor (e.g., the system processor 102) operating according to stored software programs, by specialized hardware, firmware or a combination thereof.

Input to the planning aspect of the migration stage 204 is an initial and final configuration of data objects on devices, and a description of the storage system. The initial configuration of data may be obtained from the prior design for the system 100. The final configuration of the data and the description of the data storage system 100 are essentially the new design for the system 100 obtained from the design stage 206.

An algorithm that may be used to automatically develop a migration plan includes steps of identifying stores which can already be moved to their final location and then adding those moves to the plan. Next, a store may be chosen and all of the stores occupying its target location may be moved to scratch space. Then, the process may be repeated (i.e. by adding to the plan a move of the chosen store to its final location and, then, choosing another store). Stores may be chosen generally in order of those that occupy a large space in relation to the size of stores that need to be moved to scratch space.

In addition, if all the data objects are all the same size, for example, by fragmenting them into fixed sized extents, other algorithms can be used. The initial and final states of the system can be converted into a directed multigraph of the form, G=(V, E) without self-loops, referred to as the "demand graph," which may be stored, for example, in the memory 104 (FIG. 1). A multigraph is a graph which can have multiple edges between any two nodes. Each of the vertices in the demand graph corresponds to a storage device, and each of the directed edges (u, v) represents a data object that must be moved from storage device u (in the initial configuration) to storage device v (in the final configuration). The output is a positive integer label for each edge which indicates when the data that corresponds to the edge is to be moved.

Figure 8:
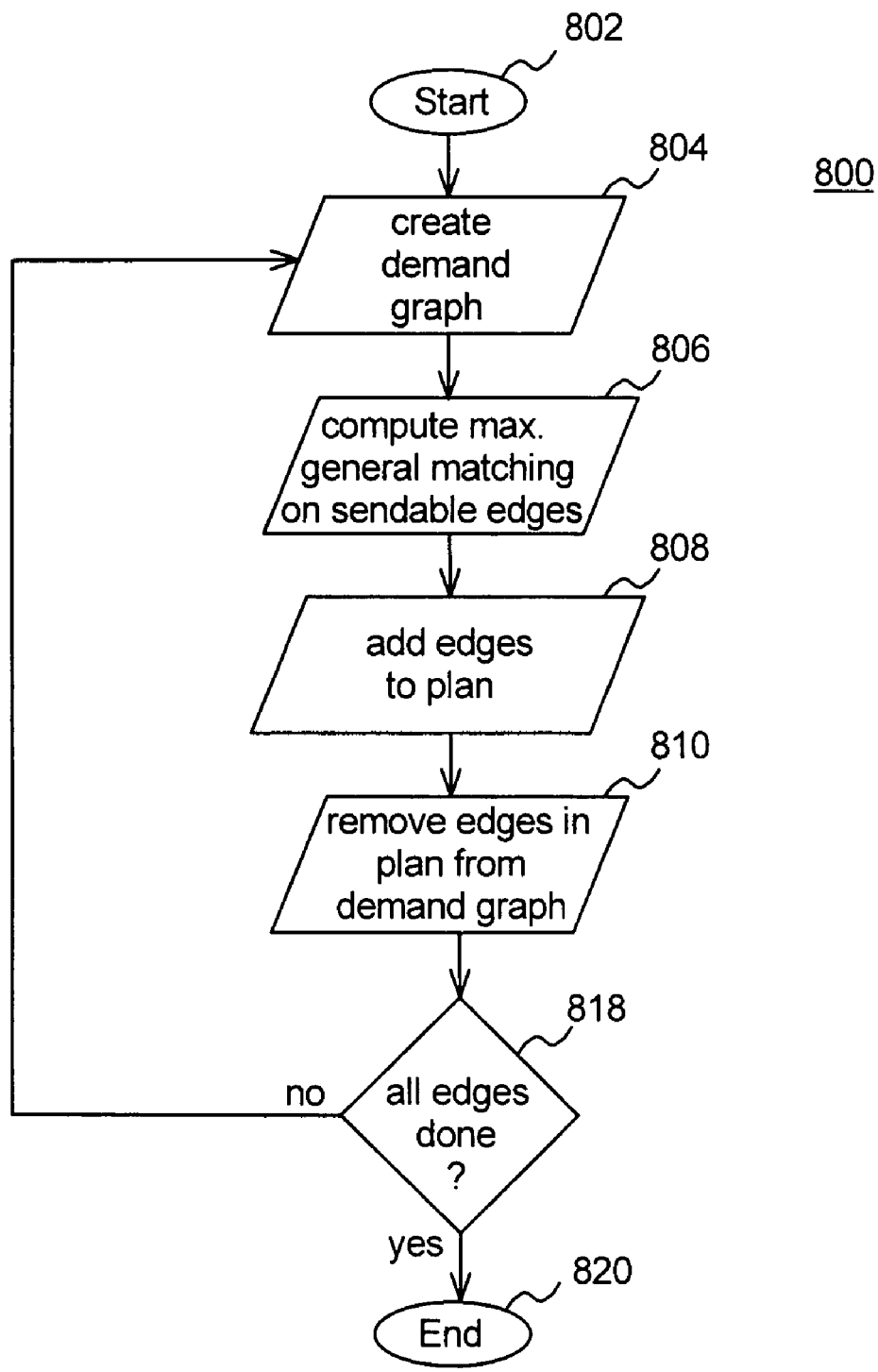
FIG. 8 illustrates an algorithm for developing a direct migration plan where there are space constraints.

FIG. 8 illustrates an algorithm 800 for developing a direct migration plan. We assume that each node has at least one free space in both the initial and in the final configuration and constrain the migration plan to use only this amount of free space. In particular, at the end of each step of a migration, the number of objects stored at a node is no more than the assumed free space at that node. In needed, however, scratch space may be used to obtain free space at a node. For example, data stores that are not planned to be moved, or stores that are planned to be moved, may be placed in the scratch space, depending on the circumstances.

Program flow begins is a start state 802 and moves to a state 804 in which, a graph G' may be formed in which G' is induced by the sendable edges in the demand graph G. An edge is sendable if there is free space at its destination.

Then, in a state 806, a maximum general matching may be computed on G'. In a state 808, all edges in the matching computed in the state 806 may be added to the plan for sending in a first step.

Next, in a state 810, all of the edges added to the plan in the state 808 may be removed from the demand graph. From the state 810, program flow moves to a state 812, in which a determination is made as to whether any edges remain in the graph. If so, then program flow returns to the state 804 to continue identifying when the data associated with each edge should be moved.

Finally once all of the edges have been removed from the demand graph, program flow terminates in a state 814. Then, the data objects may be moved according to the plan. This is explained in more detail herein with reference to FIGS. 9–13.

Figure 9:
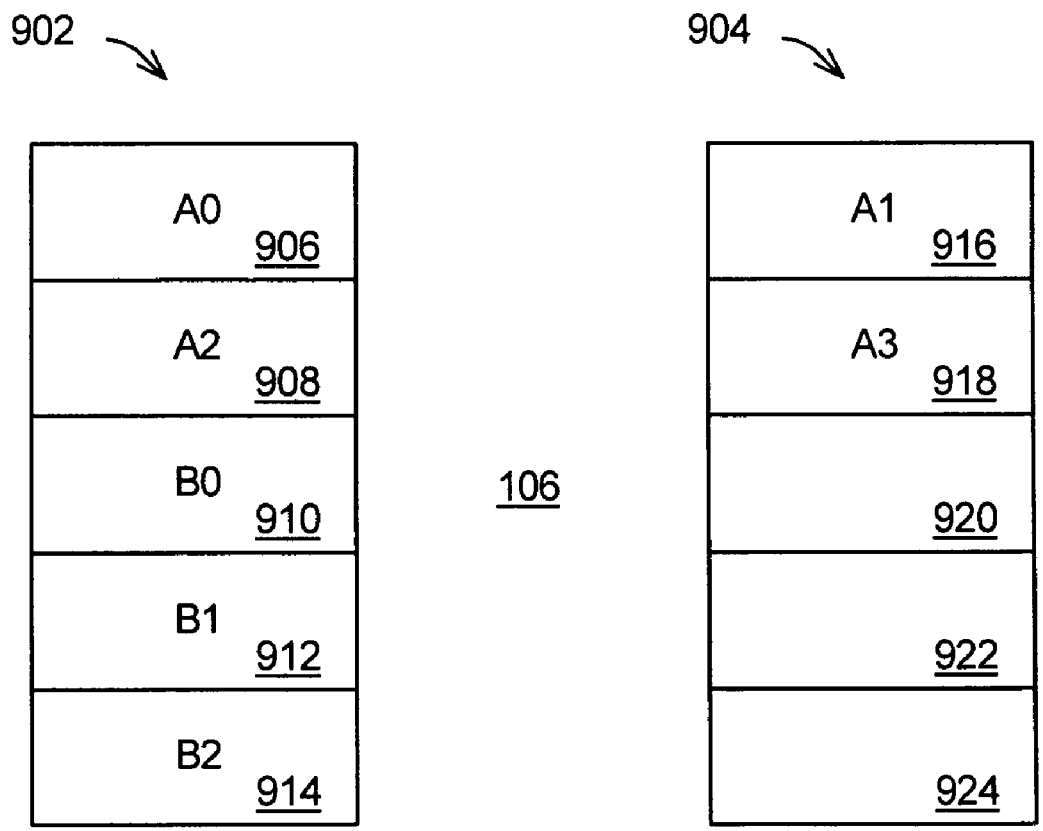
FIG. 9 illustrates storage devices that may be included in the data storage of FIG. 1.

FIG. 9 illustrates storage devices 902 and 904 (e.g., LUs provided by one or more disk arrays) that may be included in the data storage 106 of FIG. 1. Each device 902 and 904 includes a number of divisions (also referred to as "extents"). Thus, device 902 includes divisions 906, 908, 910, 912, and 914, while device 904 includes divisions 916, 918, 920, 922 and 924. Each division includes a number of physical locations for data storage. For example, the divisions 906–924 may each include four megabytes (4 MB) of data storage space. While two devices 902 and 904, each having five divisions, are illustrated in FIG. 9, it will be apparent that a different number of devices may be provided and that each device may include more or fewer divisions. Further, it will be apparent that the divisions may be of any size and that the divisions need not all be the same size.

One or more logical volumes may be constructed among the devices 902 and 904. A first volume "A" may require four extents and may be striped across the devices 902 and 904 for performance reasons. Thus, a first portion A0 may be stored on extent 906 of device 902; a second portion A1 may be stored on extent 916 of device 904; a third portion A2 may be stored on extent 908 of device 902; and a fourth portion A3 may be stored on extent 918 of device 904. A second volume "B" may require three extents and may be allocated to the remaining extents of device 902. Thus, a first portion B0 may be stored on the extent 910; a second portion B1 may be stored on the extent 912; and a third portion B2 may be stored on the extent 914. While two logical volumes "A" and "B" are illustrated, it will be apparent that more or fewer logical volumes may be stored by the devices 902 and 904.

After the logical volumes (e.g., logical volumes A and B) have been set up, it may be desired to change their layout. For example, as a result of performance of the design step 202 (FIG. 2), it may be discovered that data accesses are concentrated to one storage device which may result in reduced performance. Accordingly, rearranging the data such that the data accesses are more uniformly distributed among the storage devices may be desired so as to improve performance.

Figure 10:
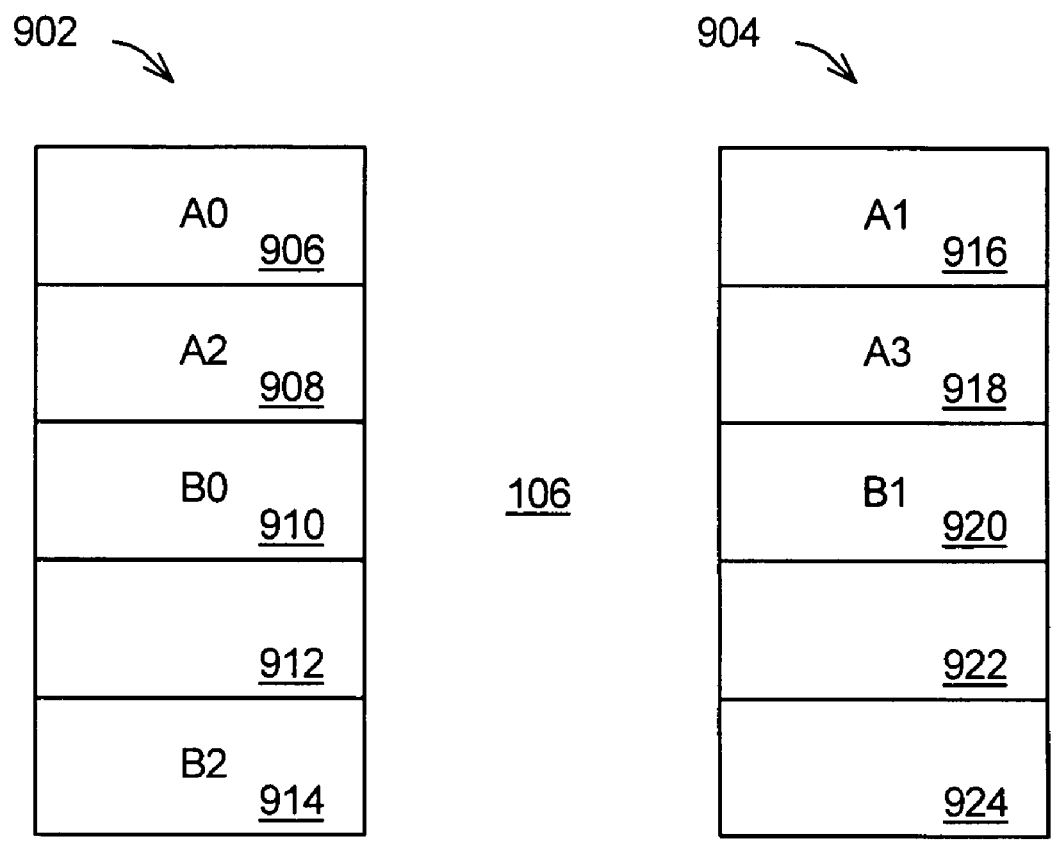
FIG. 10 illustrates the devices of FIG. 9 after having migrated a first portion.

Assume, for example, that the design step 202 determines that it would be preferable to stripe the portions B0, B1 and B2 of logical volume B across the devices 902 and 904. Thus, the portion B1 stored by extent 912 of device 902 may be migrated to the extent 920 of device 904. This may be accomplished by physically copying the portion B1 to the extent 920 and re-mapping the appropriate portion of the logical volume B to the storage locations of extent 920. This is shown in FIG. 10.

Figure 11:
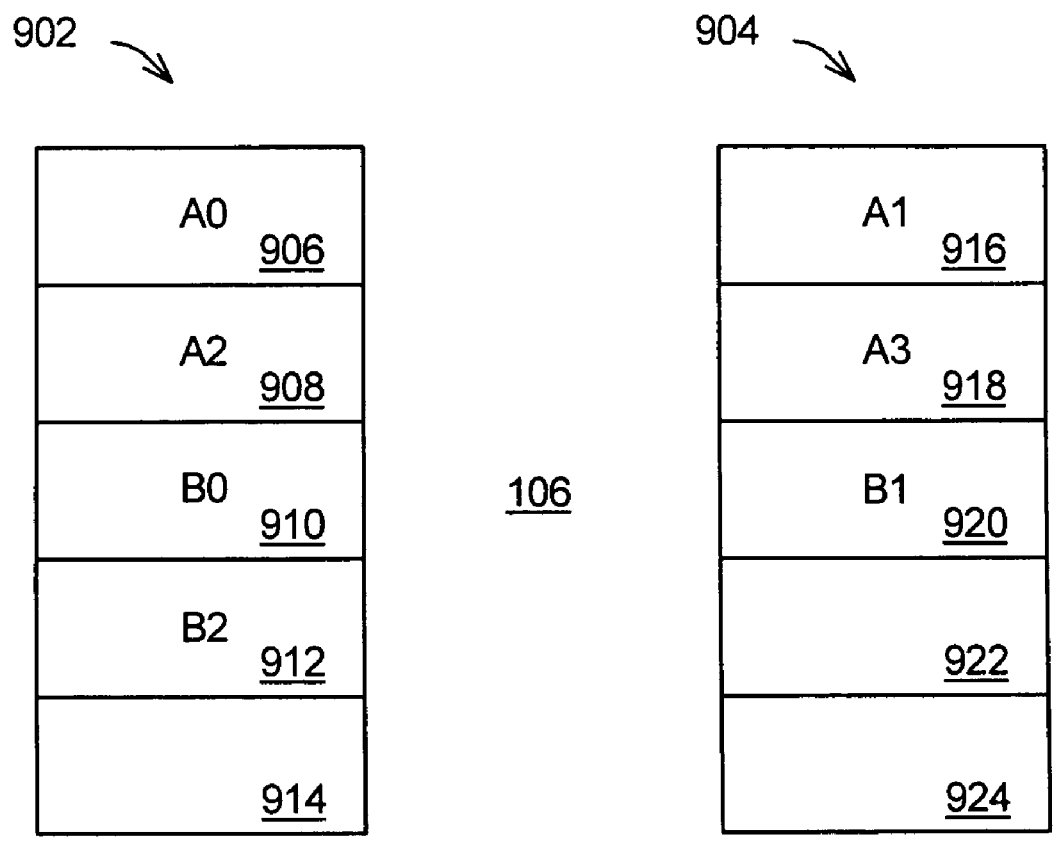
FIG. 11 illustrates the devices of FIG. 9 after having migrated a second portion.

The portion B2 may then be moved from the extent 914 to the extent 912, which was vacated by portion B1. This may be desired, for example, to consolidate the free space available in the device 902 into contiguous storage locations. This migration may be accomplished similarly to the migration of portion B1, described above. That is, by physically copying the portion B2 to the extent 912 and re-mapping the appropriate portion of the logical volume B to the storage locations of extent 912. FIG. 11 illustrates the devices 902 and 904 after having migrated the portion B2 to extent 912.

Accordingly, a technique implementing the migration step 204 for a logical volume has been described. This technique advantageously provides for the physical rearrangement of data in a logical volume without having to completely reconstruct the logical volume.

In accordance with another aspect of the migration stage 204 (FIG. 2), shadow volumes may be used to evaluate a proposed layout for one or more logical volumes before the data is physically migrated to the new layout. Assume that the layout of FIG. 9 is to be changed as indicated by the design stage 202. As a particular example, assume that the logical volume A is to be expanded to include two additional extents.

One or more "shadow" volumes may be instantiated in accordance with the new layout. A shadow volume is a representation of a possible layout of an existing logical volume. In other words, the shadow volume indicates how the data might be stored by the storage devices. The shadow volume may include, for example, representations of the location(s) and space requirements within the storage system for the data underlying the logical volume and a map that correlates logical addresses to physical storage locations within the data storage system. Unlike a mirror copy in which two copies of the data are physically maintained and, thus, can be read from and written to, a shadow volume does not actually contain the underlying data. As such, the shadow volume cannot generally be read from or written to and can encompass extents that are currently storing other data.

The system processor 102 (FIG. 1) may instantiate the shadow volumes in response to the new layout developed by the design stage 202. Accordingly, the representation of the possible layout for the data may be stored in the memory 104 without actually changing the layout of the logical volumes.

Figure 12:
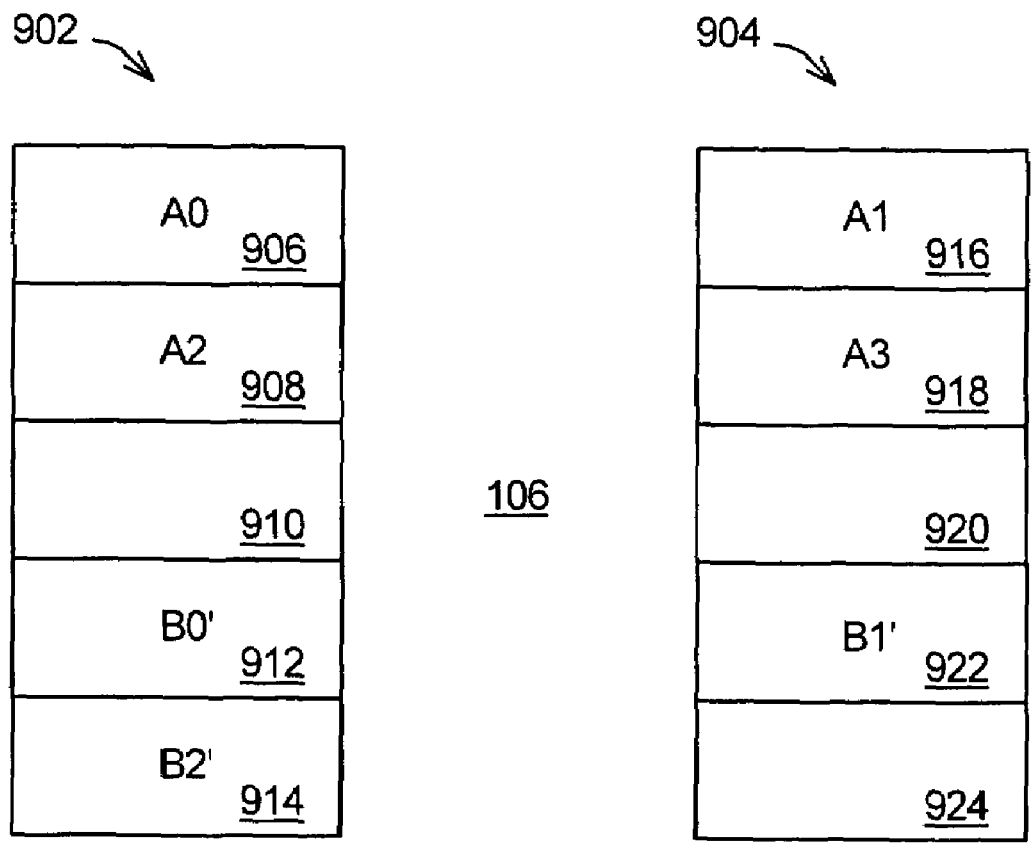
FIG. 12 illustrates the storage devices having a shadow volume superimposed thereon.

FIG. 12 illustrates the storage devices 902 and 904 having a shadow volume B' superimposed thereon. The logical volume B is not shown in FIG. 12, however, it will be understood that it is unchanged, while shadow volume B' is instantiated over the devices 902 and 904 (note that the illustrated shadow volume B' is different from the final location of volume B shown in FIG. 11). Shadow volume B' includes portions B0', B1' and B2' that correspond to the portions B0, B1 and B2, respectively, of logical volume B. To make room available on device 902 for expanding the logical volume A, portion B0' is positioned at extent 912 of device 902, portion B1' is positioned at extent 922 of device 904 and portion B2' is positioned at extent 914 of device 902.

Then, the data stored by the logical volumes may be migrated into the new layout. This may be accomplished by the system processor 102 controlling the data movement as indicated by the new layout. In addition, the system 100 may appropriately reconstruct the logical volumes, such as by re-mapping the logical addresses presented to applications running on the system 100 to the physical storage location to which the data has been moved.

In one embodiment, the system administrator may control the data migration, such as via a user interface provided by the system 100. For example, the system 100 may present the system administrator with a plan for migrating the data as a series of movements of data stored by the extents. The system administrator may then approve or modify the plan. Alternately, the plan may be automatically approved by the system 100 in response to analysis of the plan by the system 100.

Figure 13:
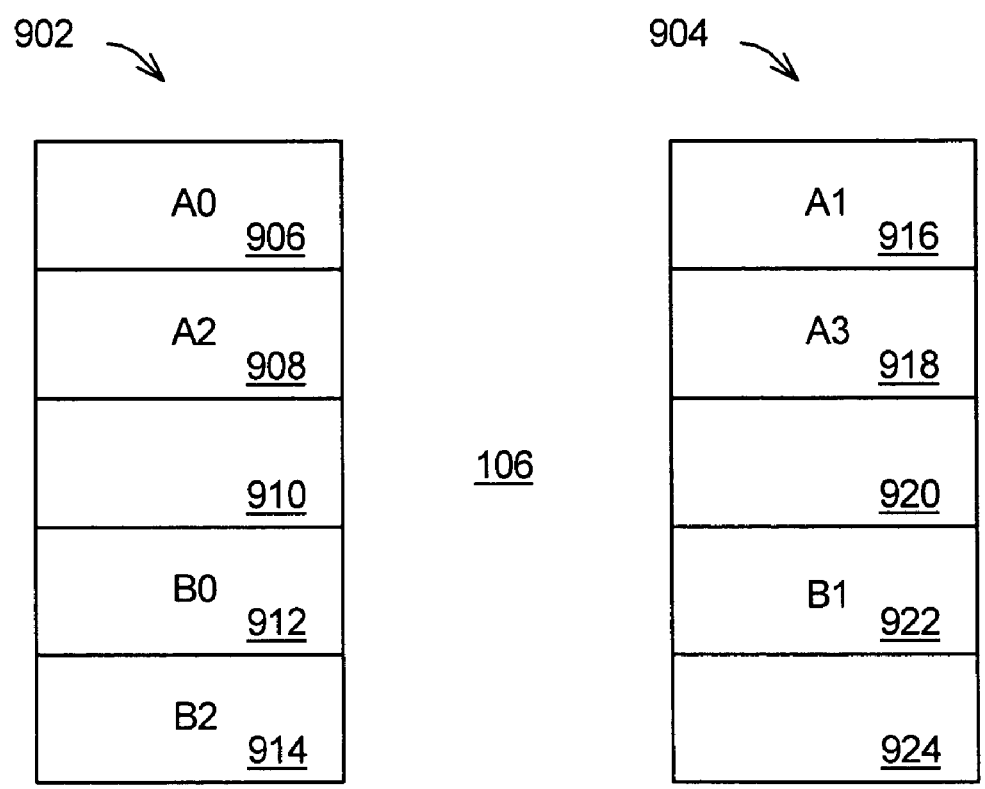
FIG. 13 illustrates the storage devices of FIG. 9 after a logical volume has been migrated to the new layout indicated in FIG. 12.

The number of moves required to achieve the desired layout will depend upon the circumstances. As a specific example referring to FIGS. 9 and 12, the plan may specify that the data stored by extent B1 is to be moved to extent 922. Then, the data stored by extent B0 may be moved to extent 912. FIG. 13 illustrates the storage devices of FIG. 9 after the logical volume B has been migrated to the new layout indicated in FIG. 12.

The above-described data migration technique is disclosed in U.S. patent application Ser. No. 09/954,104, "Logical Volume Data Migration," filed Sep. 17, 2001, the contents of which are hereby incorporated by reference. It will be apparent that a migration technique could be used that differs from the techniques described above.

5. CONCLUSION

Specific techniques have been described for implementing each of the analysis stage 202, design stage 204 and migration aspects of the present invention. Once the migration stage 204 is complete, the analysis stage 206 may be repeated. Eventually, it is expected that a fairly optimal design will be achieved.

Thus, the loop process 200 can reduce capacity in the design where the design is initially over-provisioned. This occurs in the solver aspect of the design stage 202 since the assignment of stores to devices will likely result in devices to which no stores are assigned. Accordingly, the solver will drop those devices from the design.

In one embodiment, headroom is incorporated into the process 200. This means that once the design has converged, the devices of the system 100 operate at less than 100% utilization. Headroom may be explicitly provided in the solver aspect of the design stage 202 or may be incorporated into the component models. Thus, for example, assume that a target for utilization is 90%. If the workload increases, the utilization will increase above 90%. As a result, capacity will be added to the design in an attempt to maintain the target headroom. Conversely, if the workload is reduced, the utilization will fall below 90%. As a result, capacity may be removed from the design in an attempt to maintain the target headroom. Accordingly, the data storage system 100 may expand and/or contract with changes in the workload.

Under certain circumstances, it may be desired to set the headroom to a level that is above 100%. For example, the headroom may be set to 150%. As a result, the invention will tend to achieve a design in which the components are over-committed by an amount indicated by the headroom. This may be desired, for example, to reduce the cost of the storage system.

The time to converge to a design will generally depend upon how long each iteration takes and on how many loop iterations must be performed. It is expected that the time for each iteration will be dominated by running the applications (analysis stage 202) and implementing the new designs (migration stage 204). Application run times may, for example, require from several minutes to several hours. Implementing the design can also take from several minutes to several hours because it generally involves moving some fraction of the potentially sizable data stored by the system 100. Further, the number of loop iterations depends on the scale of the system 100 and on the degree of mismatch between the initial and final designs.

Once the design has converged, the process 200 may be halted since additional iterations would not be expected to improve the design. However, as the storage system 100 operates, changing demands may cause its performance to be reduced. Accordingly, the process 200 may be repeated to maintain good performance of the system 100.

In some cases, the storage system should meet certain constraints. For example, it may be desired to limit the cost of the system 100. Thus, the process 200 may be configured to produce a storage system that is limited in maximum price even though the resulting system may not meet the workload's performance requirements. This may be accomplished, for example, by assigning costs to the components of the design and constraining the solver aspect of the design stage 206 to incorporate them into the design such that their cumulative costs do not exceed a specified maximum cost. In other circumstances, the system administrator may wish to include excess resources to accommodate future growth in the workload or to provide headroom for unexpected peak loads.

Although an illustrative embodiment of the invention is described for a disk array storage system, those skilled in the art should recognize that the techniques described herein may be applied to other computer systems, networks or subsystems.

For example, the present invention may be applied to adaptation for a processor or CPU farm. In which case, the analysis stage may include analysis of each process which operates in the CPU farm. For example, process accounting software, the UNIX "ps" command or other tools may be used to gather data on CPU usage patterns. This may include recording, for example, the frequency with which the various processes occur, whether a process is operating-system specific and the CPU usage for each process.

For a CPU farm, the modeling aspect of the design stage 202 may include forming models of CPUs based on their performance benchmarks, such as the well-known "SPEC" benchmarks developed by Standard Performance Evaluation Corporation. For each CPU, the CPU utilizations may be additive. If the various CPUs operated at different processor speeds, then the CPU utilizations may be scaled, such as by a ratio of the SPEC performance of the CPUs, a ratio of CPUs clock speeds or some other property. Further, utilizations may be multiplied by a factor related to the frequency that a process occurs at a particular node (e.g., CPU) in the system.

For the solver aspect of the design stage 202 (FIG. 2), each process may be assigned to nodes (each node being a host or CPU), along with a frequency for the process to occur at that node, in a device-tree data structure, similarly to the structure 700 of FIG. 7. Additional CPUs may be added to the system as needed. Each added CPU potentially having different configurations, such as speed and operating system. Similarly, the existing CPUs may be reconfigured, for example, to run at a different speed or to have a different operating system.

If a process fits on a node, this means that the CPU has the capacity to run the process. Otherwise the frequency for the process at that node may be reduced and the assignment tried again. If it again fails, or a minimal frequency is reached, a new node may be created. The solver stage 202 is completed once all processes have been assigned. Preferably, a condition is reached where the assigned frequency, potentially spread across several nodes for each process, is approximately equal to the frequency found in the analysis stage.

For the CPU farm, processes may be assigned to nodes in accordance with contents of an assignment table. Thus, the migration stage 204 may include modifying the contents of the table to reassign the processes to the nodes.

In accordance with another aspect, the invention may be applied to adaptation of a data caching system (e.g., a network or mesh of cache servers or memory devices, which may be in proximity to network users in order to reduce network traffic). For the analysis stage 206, the frequency of use and size of each object placed in the cache may be recorded. The means for accomplishing this will generally depend on the application which uses the caching system. For example, web caches typically maintain a log which can serve as the basis for determining the frequency of use and object sizes.

In the modeling aspect of the design stage 202, each cache node may be characterized, for example, by its storage capacity and transmission rate. This is to ensure that all objects assigned to the cache node fit into it and that it is able to transmit all of the objects in its cache when needed. More particularly, each object size may be multiplied by its transmission frequency. A sum of these values of each node should be less than the node's maximum transmission rate.

In the solver aspect of the design stage 202, for a given target cache hit rate (or backend access rate), objects may be assigned to the cache nodes in a device-tree data structure similar to that in FIG. 7 in the order of frequency of a product of frequency of use and object sizes. Cache assignments may be split among plural nodes if the frequency is too high for a single node to handle. Nodes may be added as needed to accommodate the cache assignments. Addition of nodes may cease once a goal (e.g., hit rate or backend access rate) is reached for all the cache assignments.

For the migration stage 206, the cache system may be modified to indicate where in the system each different object is to be located. The cache nodes may then be pre-located with the objects they will be serving or each cache node may load its objects on its own in accordance with the assignments indicated in the design stage 206.

In still another example, the present invention may be applied to adaptation of database indices in a database system. Database indices are used for more-readily accessing selected data stored in a database compared to scanning tables of the database for data that is not indexed. For the analysis stage 202, queries that are run through a database management system (DBMS) may be examined to count the number of times certain table scans are performed in order to determine how much an index for a particular column or group of columns would be used instead of the table scans. The number of updates made to each of the different columns may also be counted.

For the modeling aspect of the design stage 202, the time savings for doing index lookups instead of the table scans counted in the analysis stage may be compared to the time that would be required for doing updates of tables with indices. For the solver aspect, various different indices may be examined for possible addition to the database. Existing indices may be examined to determine whether they result in a net savings of time. A goal for the design stage 202 would generally be to develop the indices such that a good overall net savings of time is obtained. The cost of creating/destroying the different indices may be included in determining the amount of time that would be saved by a particular arrangement.

In the migration stage 204, the new indices indicated by the design stage 206 may be created and the old ones that are no longer included in the design may be removed.

While the foregoing has been with reference to particular embodiments of the invention, it will be appreciated by those skilled in the art that changes in these embodiments may be made without departing from the principles and spirit of the invention, the scope of which is defined by the following claims.

What is claimed is:

1. A method for adaptation of a computer system, network or subsystem comprising developing a design for the system and performing an automated loop comprising implementing the design; analyzing operation of the design after said implementing; and modifying the design based on results of said analyzing.

2. The method according to claim 1, further comprising forming models of components of the system and applying results of said analyzing to the models.

3. The method according to claim 2, wherein said applying results of said analyzing to the models indicates utilization of a component of the system.

4. The method according to claim 3, wherein said modifying the design is performed in response to the utilization.

5. The method according to claim 4, wherein said modifying is also performed in response to a desired headroom level.

6. The method according to claim 5, wherein said desired headroom level provides that components of the system operate at less than 100% utilization.

7. The method according to claim 5, wherein said desired headroom level provides that components of the system operate at more than 100% utilization.

8. The method according to claim 1, wherein said implementing the design comprises forming a plan and then implementing the plan.

9. The method according to claim 1, wherein said system comprises a CPU farm.

10. The method according to claim 1, wherein said system comprises a data caching system.

11. The method according to claim 1, wherein said system comprises a database system.

12. The method according to claim 11, wherein said modifying comprises modifying indices of the database system.

13. A method for adaptation of a data storage system, comprising developing a design for the data storage system and performing an automated loop comprising implementing the design; analyzing operation of the design after said implementing; and modifying the design based on results of said analyzing.

14. The method according to claim 13, further comprising forming models of components of the data storage system and applying results of said analyzing to the models.

15. The method according to claim 14, wherein said applying results of said analyzing to the models indicates utilization of a component of the data storage system.

16. The method according to claim 15, wherein said modifying the design is performed in response to the utilization.

17. The method according to claim 16, wherein said modifying is also performed in response to a desired headroom level.

18. The method according to claim 17, wherein said desired headroom level provides that components of the data storage system operate at less than 100% utilization.

19. The method according to claim 17, wherein said desired headroom level provides that components of the data storage system operate at more than 100% utilization.

20. The method according to claim 13, wherein said implementing the design comprises forming a plan for migrating data and then implementing the plan.

21. The method according to claim 20, wherein said forming a plan comprises forming a directed multigraph and computing a maximum general matching.

22. The method according to claim 13, wherein said analyzing comprises forming a trace of storage system events and forming a workload characterization based on the trace.

23. The method according to claim 22, wherein said workload characterization comprises a number of parameter values that summarize the trace.

24. The method according to claim 23, further comprising forming models of components of the data storage system and applying said workload characterization to the models.

25. A method for adaptation of a data storage system, comprising:
developing a design for the data storage system;
implementing the design;
forming a trace of storage system events;
forming workload characterization from the trace;
applying the workload characterization to models of components of the data storage system, wherein said applying indicates utilization of a component of the data storage system; and
modifying the design in response to the utilization indicated by said analyzing.

26. The method according to claim 25, wherein said modifying results in a modified design and further comprising implementing the modified design.

27. The method according to claim 26, wherein said modifying comprises forming a device tree data structure that is representative of the storage system.

28. The method according to claim 27, wherein said modifying comprises reassigning data stores to components of the data storage system.

29. The method according to claim 28, wherein said implementing the modified design comprises forming a plan for migrating data and then implementing the plan.

30. The method according to claim 29, wherein said forming a plan comprises forming a directed multigraph and computing a maximum general matching.

31. The method according to claim 25, wherein said modifying is also performed in response to a desired headroom level.

32. The method according to claim 31, wherein said desired headroom level provides that components of the data storage system operate at less than 100% utilization.

33. The method according to claim 31, wherein said desired headroom level provides that components of the data storage system operate at more than 100% utilization.

* * * * *